US011313950B2

(12) United States Patent
Kruglick et al.

(10) Patent No.: US 11,313,950 B2
(45) Date of Patent: Apr. 26, 2022

(54) MACHINE LEARNING BASED HIGHWAY RADAR VEHICLE CLASSIFICATION ACROSS MULTIPLE LANES AND SPEEDS

(71) Applicant: Image Sensing Systems, Inc., St. Paul, MN (US)

(72) Inventors: Ezekiel Kruglick, Poway, CA (US); Michael Jaques, Roseville, MN (US); Seth Anderson, New Brighton, MN (US); James Cikanek, Lakeville, MN (US); Zachary Pearson, Saint Paul, MN (US); Randall Johnson, Spring Lake Park, MN (US); Aaron Becker, Minneapolis, MN (US); Levi Remily, Saint Paul, MN (US); Saad Bedros, West St Paul, MN (US)

(73) Assignee: Image Sensing Systems, Inc., St. Paul, MN (US)

( * ) Notice: Subject to any disclaimer, the term of this patent is extended or adjusted under 35 U.S.C. 154(b) by 325 days.

(21) Appl. No.: 16/248,525

(22) Filed: Jan. 15, 2019

(65) Prior Publication Data
US 2020/0225321 A1    Jul. 16, 2020

(51) Int. Cl.
*G01S 7/41*    (2006.01)
*G06N 3/08*    (2006.01)
*G06V 20/58*    (2022.01)

(52) U.S. Cl.
CPC .............. *G01S 7/417* (2013.01); *G01S 7/415* (2013.01); *G01S 7/412* (2013.01); *G06N 3/08* (2013.01); *G06V 20/58* (2022.01)

(58) Field of Classification Search
CPC ........ G06N 20/00; G06N 3/08; G06N 3/0454; G06N 3/02; G05D 1/0088;
(Continued)

(56) References Cited

U.S. PATENT DOCUMENTS

| | | | | |
|---|---|---|---|---|
| 5,949,367 A | * | 9/1999 | Trompf | G06K 9/6267 342/90 |
| 2008/0278366 A1 | * | 11/2008 | Behrens | G01S 13/92 342/109 |

(Continued)

FOREIGN PATENT DOCUMENTS

| | | | | |
|---|---|---|---|---|
| CA | 2853879 A1 | * | 5/2013 | ............. G01S 13/56 |
| WO | 2014105865 A1 | | 7/2014 | |

(Continued)

*Primary Examiner* — Olumide Ajibade Akonai
(74) *Attorney, Agent, or Firm* — Hertzberg, Turk & Associates, LLC

(57) ABSTRACT

Systems and methods for training and using machine learning models to classify vehicles from highway radar systems are provided. The training systems may use auxiliary radar processing to separate events by lane, length, and/or speed, and then use separate event data groups pooled from similar or proximate lanes, lengths, and/or speeds to train multiple models. At estimation time, incoming events may be grouped using similar groupings as those used during training to select which model to use. An incoming event may be applied to the neural network operations of the selected model to generate an estimate. Generating an estimate may involve successive applications of multiple linear convolutions and other steps along varying or alternating dimensions of the in-process data.

19 Claims, 20 Drawing Sheets

(58) Field of Classification Search
CPC ......... G05D 2201/0213; G05D 1/0257; G05D 1/0221; G06K 9/00805; G06K 9/6267; G06K 9/6282; G06T 2207/20081; G06T 2207/20084; G06T 2207/30261; G06T 2207/10044; G01S 13/931; G01S 7/417; G01S 7/412; G01S 13/91; G01S 7/415; G01S 13/584; G01S 13/589; G01S 7/41; G01S 13/52; G01S 13/92; G01S 2013/93271; G01S 2013/93273; G01S 7/411; G01S 17/931; G01S 13/89; G08G 1/0116; G08G 1/015; G08G 1/017; G06V 20/54; G06V 2201/12; G06V 20/64; G06V 20/58

See application file for complete search history.

(56) References Cited

U.S. PATENT DOCUMENTS

| | | | | |
|---|---|---|---|---|
| 2011/0103647 A1* | 5/2011 | Leopold | ................ | G08G 1/015 382/103 |
| 2015/0178383 A1 | 6/2015 | Corrado et al. | | |
| 2018/0348343 A1* | 12/2018 | Achour | .............. | H01Q 15/0066 |
| 2019/0204834 A1* | 7/2019 | Harrison | ................. | G01S 17/58 |
| 2019/0392268 A1* | 12/2019 | Tariq | ................... | G06K 9/00791 |
| 2020/0193511 A1* | 6/2020 | Saito | ........................ | G06N 3/08 |
| 2020/0210721 A1* | 7/2020 | Goel | .................... | G06K 9/6267 |
| 2021/0142662 A1* | 5/2021 | Schleweis | .............. | G08G 1/052 |

FOREIGN PATENT DOCUMENTS

| | | |
|---|---|---|
| WO | 2014105866 A1 | 7/2014 |
| WO | 2018048945 A1 | 3/2018 |
| WO | 2018064591 A1 | 4/2018 |
| WO | 2018071392 A1 | 4/2018 |
| WO | 2018081089 A1 | 5/2018 |
| WO | 2018083532 A1 | 5/2018 |
| WO | 2018083667 A1 | 5/2018 |
| WO | 2018083668 A1 | 5/2018 |
| WO | 2018083669 A1 | 5/2018 |
| WO | 2018083670 A1 | 5/2018 |
| WO | 2018083671 A1 | 5/2018 |
| WO | 2018083672 A1 | 5/2018 |

* cited by examiner

COMPUTER PROGRAM PRODUCT 1600

SIGNAL BEARING MEDIUM 1602

<u>1604</u> ONE OR MORE INSTRUCTIONS TO:

GENERATE RADAR DETECTION EVENTS IN RESPONSE TO VEHICLES PASSING THROUGH THE FIELD OF VIEW OF A RADAR SENSOR;

GENERATE RADAR SUPPLEMENTAL DATA BASED ON THE GENERATED RADAR DETECTION EVENTS;

SELECT A MODEL FOR ESTIMATING A CLASS REPRESENTED BY A RADAR DETECTION EVENT USING THE RADAR SUPPLEMENTAL DATA;

APPLY THE RADAR DETECTION EVENT AGAINST THE SELECTED MODEL TO ESTIMATE THE CLASS FOR THE RADAR DETECTION EVENT; AND/OR

STORE AND/OR TRANSMIT THE ESTIMATED CLASS AND/OR THE RADAR SUPPLEMENTAL DATA .

| COMPUTER-READABLE MEDIUM 1606 | RECORDABLE MEDIUM 1608 | COMMUNICATIONS MEDIUM 1610 |

FIG. 16

MACHINE LEARNING BASED HIGHWAY RADAR VEHICLE CLASSIFICATION ACROSS MULTIPLE LANES AND SPEEDS

BACKGROUND

Unless otherwise indicated herein, the materials described in this section are not prior art to the claims in this application and are not admitted to be prior art by inclusion in this section.

A number of highway applications desire classification of passing vehicles (e.g., knowledge on what type of vehicle each one is). Knowing the classes of vehicles that move past may help with accurate traffic management, planning, and predictive estimations of later traffic, among other things. For historical reasons (axle load sensors), the European "bast" (German federal highway research institute) categories are based on weight, which makes it almost impossible to classify those categories automatically using other sensors. Another form of classification is the Federal Highway Administration (FHWA) Vehicle Classification scheme, which is based on axle count and vehicle "type" (e.g., passenger cars and pick-up trucks both have two axles but are considered different classes). The state of the art in such category counting is manual observation using humans armed with clip-boards and pens. Some countries perform motorway census counts on a regular basis and other times such vehicle census counts can be part of more local planning. Getting vehicle categories automatically may be challenging. For a camera system, humans at least have intuition on what to look for in a captured image. Radar signals generate a time domain signal that is a single value per time period (per antenna). The return signal is a function of the radar reflectivity of everything reflecting the beam at a given moment, and humans have little or no intuition on what to look for in a radar trace to recognize different vehicle types.

SUMMARY

The present disclosure generally describes techniques for providing machine learning based highway radar vehicle categorical classification across multiple lanes and speeds.

Embodiments described herein illustrate methods, devices, and systems to overcome challenges of conventional technologies by providing systems for training and using machine learning models to classify vehicles from highway radar systems. The training systems may use auxiliary radar processing to separate events based on supplemental data (e.g., by lane, length, and/or speed), and then use separate event data groups pooled from similar or proximate supplemental data types to train multiple models. At estimation time, incoming events may be grouped using similar groupings as those used during training to select which model to use. An incoming event may be applied to the neural network operations of the selected model to generate an estimate. Generating an estimate may involve successive applications of multiple linear convolutions along varying or alternating dimensions of the event data.

The foregoing summary is illustrative only and is not intended to be in any way limiting. In addition to the illustrative aspects, embodiments, and features described above, further aspects, embodiments, and features will become apparent by reference to the drawings and the following detailed description. Thus, the foregoing summary is not exhaustive or limiting but rather example of different embodiments non-obvious and unique to a person skilled in the art.

BRIEF DESCRIPTION OF THE DRAWINGS

The foregoing and other features of this disclosure will become more fully apparent from the following description and appended claims, taken in conjunction with the accompanying drawings. Understanding that these drawings depict only exemplary embodiments in accordance with the disclosure and are, therefore, not to be considered limiting of its scope, the disclosure will be described with additional specificity and detail through use of the accompanying drawings, in which:

FIG. 16 illustrates a block diagram of an example computer program product, some of which are arranged in accordance with at least some embodiments described herein.

DETAILED DESCRIPTION

Figure 1:
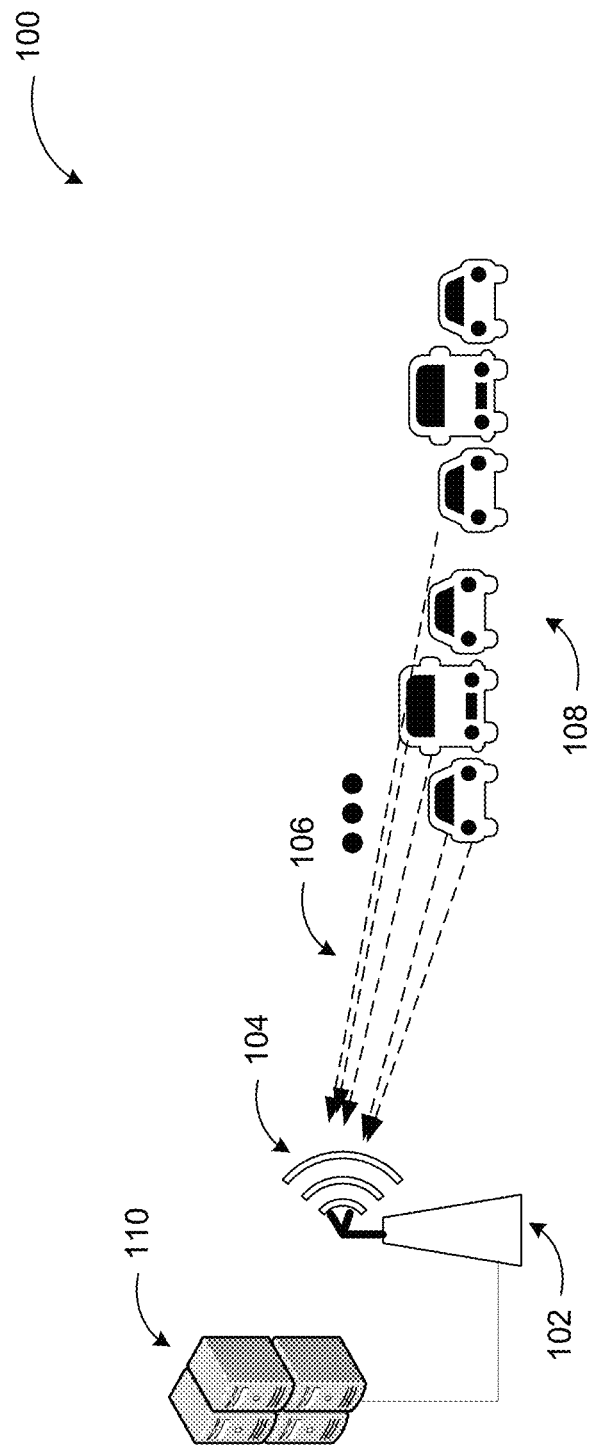
FIG. 1 includes a conceptual illustration of highway radar vehicle classification across multiple lanes and speeds.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein. Additionally, the sequence of flow of the example embodiments may be changed depending on context of user scenario of specific embodiments.

This disclosure is generally drawn, inter alia, to methods, apparatus, systems, devices, and/or computer program products related to providing machine learning based highway radar vehicle classification across multiple lanes and speeds.

Briefly stated, technologies are generally described for systems for training and using machine learning models to classify vehicles from highway radar systems. The training systems may use auxiliary radar processing to separate events by lane, length, speed, and/or other supplemental data and then use separate event data groups pooled from similar or proximate supplemental data types to train multiple models. At estimation time, incoming events may be grouped using similar groupings as those used during training to select which model to use. An incoming event may be applied to the neural network operations of the selected model to generate an estimate. Generating an estimate may involve successive applications of multiple linear convolutions along varying or alternating dimensions of the event data.

Linear processing (sometimes intermixed with non-linear steps such as rectification) of a range-separated extracted data event that represents data from a limited distance and separation of data by bins based on supplemental data, and subsequent separation of incoming events by the similar bins and application to matched models generated by similar sub-data may provide enhanced processing and accuracy of classification of vehicles from highway radar systems. It should be noted that classification according to embodiments is not based on length but the actual shape of the reflected power data. In addition to radar systems, the operations and principles described herein may also be implemented in other range-based detection systems such as sonar or lidar. As discussed herein, embodiments include separation of radar events based on supplemental data and using the groups of events to train models. The supplemental data may include a lane in which the vehicles are detected, a length of the vehicles, a speed of the vehicles, a height of the vehicles, any obstructions, and/or other attributes.

FIG. 1 includes a conceptual illustration of highway radar vehicle classification across multiple lanes and speeds, arranged in accordance with at least some embodiments described herein.

As shown in diagram 100, a number of vehicles 108 of different classes may travel at varying speeds on different lanes of a roadway. A radar system 102 with radar sensors directed at the roadway may detect the vehicles 108. A radar is an object-detection system that uses radio waves to determine the range, angle, or velocity of objects such as vehicles 108 on the roadway. Radar system 102 may include a transmitter producing electromagnetic waves 104 in the radio or microwave domain, a transmitting antenna, a receiving antenna (may be the same antenna is used for transmitting and receiving) and a receiver and processor to determine properties of the detected object(s). Electromagnetic waves 104 (pulsed or continuous) from the transmitter reflect off the vehicles 108 and return to the receiver as reflected waves 106, providing information about each vehicle's location, speed, etc. Reflected waves 106 may be processed by the radar system 102 and processed signals and/or other information may be provided to server(s) 110 for further processing, analysis, storage, etc. Electromagnetic waves 104 may in some cases be of varying frequency, such as in frequency modulated continuous wave (FMCW) systems in which the frequency changes in accordance with ramp or step patterns.

According to some embodiments, a system to detect or classify objects at a roadway may include a storage sub-system for storing models for estimating classes represented by radar detection events and one or more radar sensors with individual fields of view that are positionable at the roadway (e.g., some fields of view may be overlapping). The radar sensors may generate the radar detection events in response to vehicles passing through their field(s) of view. A processor may generate radar supplemental data based on the generated radar detection events and a controller may select a model for estimating a class represented by a radar detection event using the radar supplemental data. The processor, or another ancillary processor may apply the radar detection event (which may include data from one or multiple fields of view) against the selected model to estimate the class for the radar detection event. The system may also include an output sub-system, which may store the estimated class and/or the supplemental data in the storage sub-system and/or transmit the estimated class and/or the supplemental data to a recipient.

In one example multi-sensor embodiment, multiple radar sensors may include two sensors directed in parallel with an offset to provide data from similar perspectives at two different times as a target passes through the two fields of view. In some cases, one or both sensor outputs may be similarly processed to generate event data for classification of the target.

In another example multi-sensor embodiment, multiple radar sensors may include 16 sensors directed over a series of angles such that each sensor is pointed in a slightly different direction to provide coverage of a larger angular field of view. In this example, the radar sensors may perceive the same target from multiple angles and a pre-processor may be used to gather radar data from different range and angle bins that are associated with a single target in order to generate consolidated event data for classification of the target. Supplemental data may include multiple ranges and angles, such as a range bin per angle of detection. In some examples, multiple models may be selected for classification based on the range bin for each angle or beam where the target is detected.

In yet another example multi-sensor embodiment, multiple sensors with overlapping or non-overlapping fields of view may comprise antennas with different shapes or properties to favor diverse data gathering. For example, one antenna may have enhanced reception of circularly polarized signals while others may have enhanced reception of linear polarized signals. Data from the different antenna types may be gathered as related to particular targets and used together to generate event data for classification of the target. Such diversity of signal gathering may provide enhanced feature detection and discrimination for enhanced classification.

In some embodiments, multiple sensors may be realized by electrically steering or altering a single or fewer physical components, or by using the same physical components at different times.

According to other embodiments, detection or classification of vehicles at a roadway may include obtaining training events from time-sequential radar data provided by a radar sensor with a field of view that is positionable at the roadway, obtaining supplemental data associated with the training events by processing the radar data provided by the radar sensor and/or the training events, separating the training events into groups based on the supplemental data, and training models to estimate a class for a radar detection event.

Figure 2:
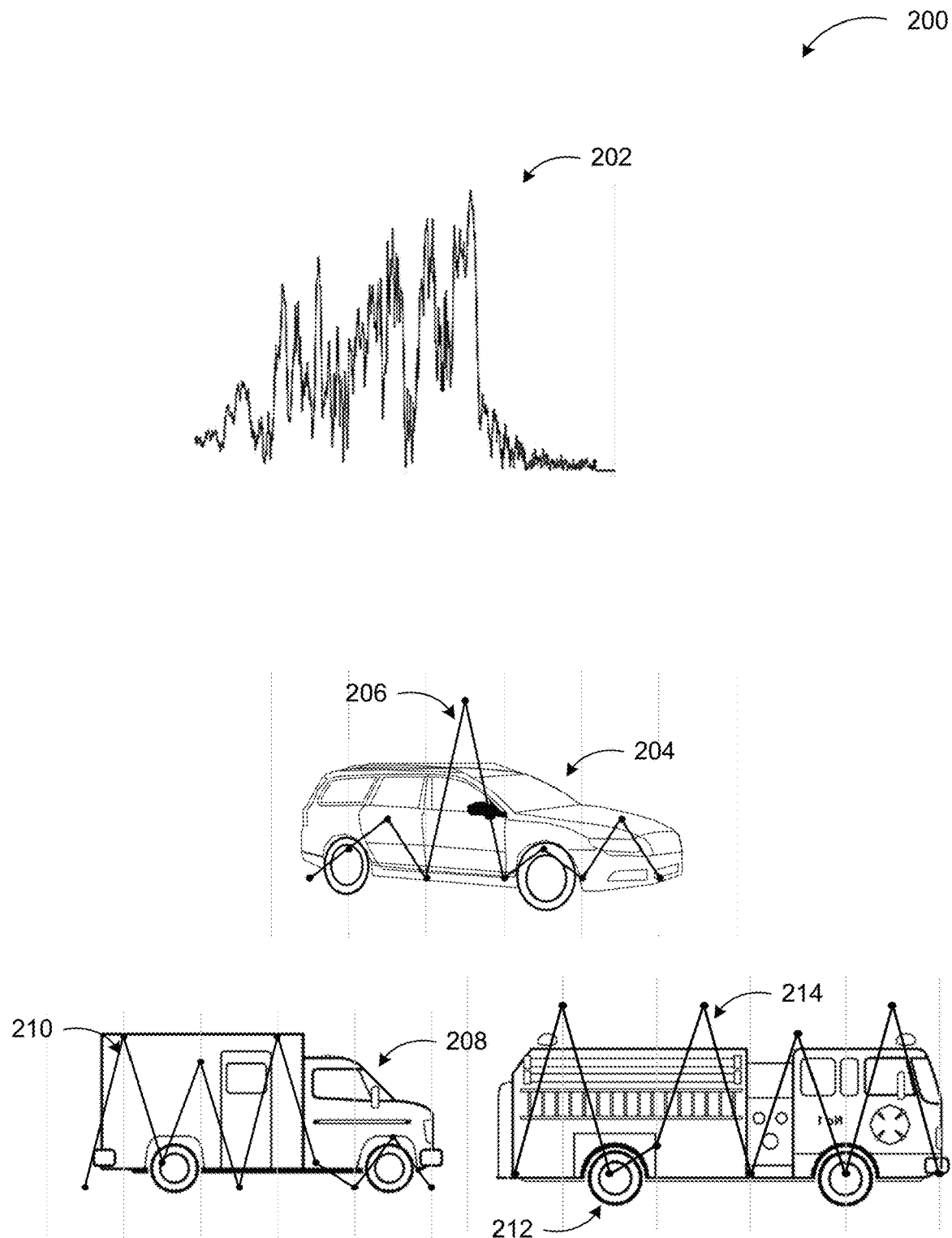
FIG. 2 shows an example actual radar event from a highway radar and three examples radar signatures (simplified) for different vehicles.

FIG. 2 shows an example actual radar event from a highway radar and three examples radar signatures (simplified) for different vehicles.

Radar signals generate a time domain signal that is a single value per time period (per antenna). The return signal is a function of the radar reflectivity of everything reflecting the beam at a given moment. Diagram 202 shows an example actual radar return event from a highway radar. This example radar event is filtered and processed to be only the return from a single lane. In some examples, diagram 202 show some a realization for at least some event data as it may be presented to the classification model. As discussed above, interpretation of radar events by human eye, and more specifically, categorization of vehicles from the radar event is impractical, if not impossible. From diagram 202, one may conclude that a back (if the vehicle is moving in the right-to-left direction, as the signal in diagram 202 is laid out) of the detected vehicle has higher reflectivity, which is reduced gradually towards the front of the vehicle. However, radar waves may be reflected based on material composition and shape of the target object. For example, conductive materials may return higher reflected waves. Similarly, sharper edges may return higher reflected waves as opposed to smoother, rounder forms. Thus, the high reflectivity at the back of the target vehicle for the radar event in diagram 202 may be metal and have sharp edges, whereas the reduction toward the front may be due to other materials (e.g., plastic or composite material) or different shape of the vehicle (smoother as opposed to a "box shape").

Despite the difficulties in human classification of vehicles from radar data, close inspection of these images of vehicles with superimposed radar data shows that some radar features have a relationship with the vehicle structure. For example, the simplified radar signature (sequence of radar events) 206 for passenger vehicle 204 shows a spike coinciding with the driver location of the vehicle, where the shape and metal composition may maximize radar wave reflection. The smoother outer shapes and material composition of the vehicle in other places may result in the reduced reflected waves.

The radar signature 210 for truck 208 shows a lower amplitude in the front, possibly due to the smoother shape of the vehicle, maybe also due to the composition of the front end of the truck 208. The back portion of the truck 208 has a box shape with sharp edges and may be composed of metal. Thus, higher reflected waves are detected. The firetruck 212, on the other hand, provides a relatively consistent and high reflected wave radar signature 214 due to the metal composition and sharp edges throughout the vehicle. In real-world events there is wider and more complex variation in radar returns for even slightly different vehicles. For example, interference pattern impacts can cause dramatically different radar return signals for objects just a few centimeters different in size.

While FIG. 2 shows vehicles from the side for ease of human consideration of the drawings, the techniques described here can also be used from other angles such as oblique views or views from ahead or behind.

Figure 3:
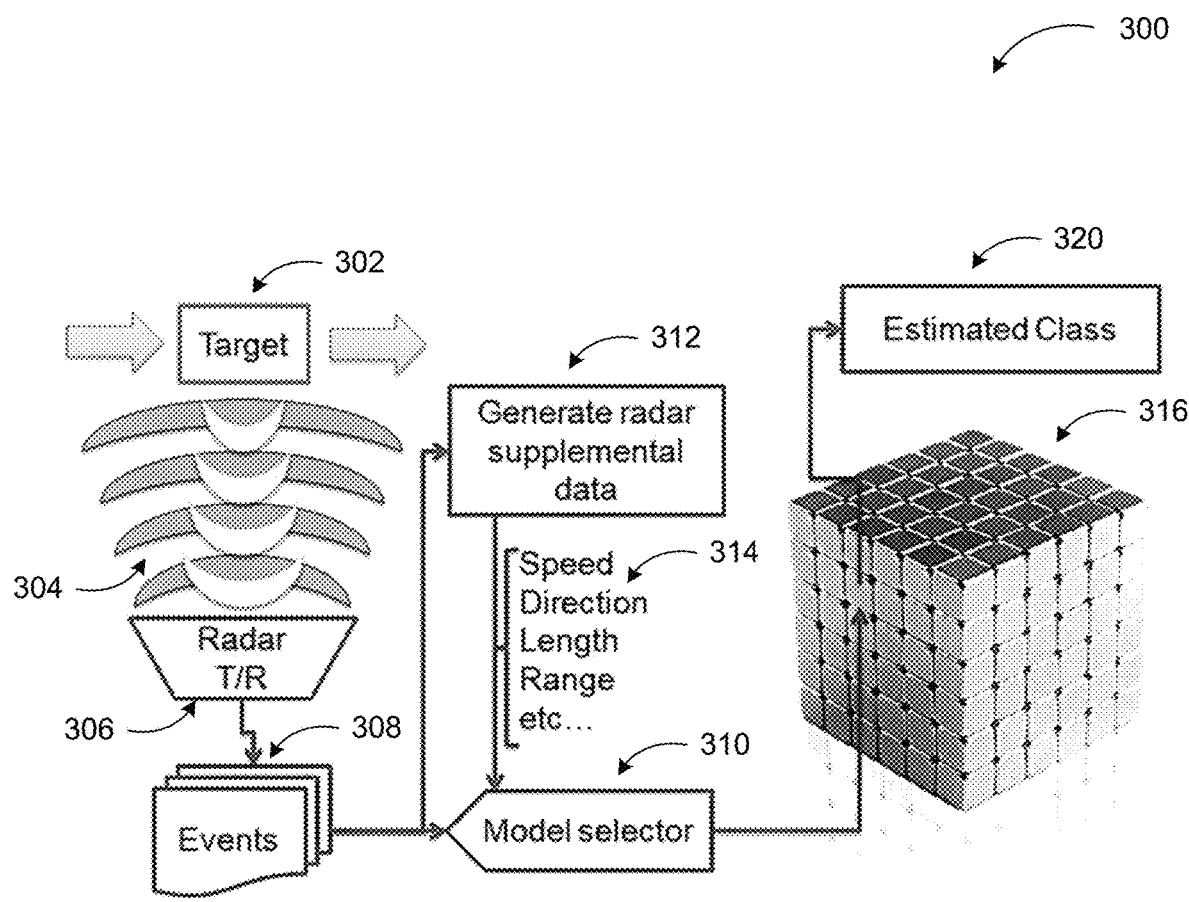
FIG. 3 includes a system diagram of an example set of operations for highway radar vehicle classification across multiple lanes and speeds.

FIG. 3 includes a system diagram of an example set of operations for highway radar vehicle classification across multiple lanes and speeds, arranged in accordance with at least some embodiments described herein.

A system according to embodiments uses machine learning models to classify vehicles from highway radar systems. The training systems may use auxiliary radar processing to separate events by supplemental data, and then use separate event data groups pooled from similar or proximate supplemental data types to train multiple models. At estimation time, incoming events may be grouped using similar groupings or groupings related to those used during training to select which model to use. An incoming event may be applied to the neural network operations of the selected model to generate an estimate. As shown in diagram 300, a radar transmit/receive module 306 may output event data 308 representing the reflected radar signal 304 from one or more targets 302 passing by. The events (after suitable preprocessing) may be used to generate radar supplemental data 312 such as speed, direction, length, range, obstruction, splash, or other indicators 314. These may be fed into a model selector 310 configured to select which of multiple machine learning models 316 to use to evaluate the event and output an estimated class 320. The machine learning models 316 may be trained on data using similar selection criteria or may include added or reduced broadness of training data as appropriate for optimal response. In some cases, additional processing or transformations may be applied to the events at any point in the flow before they are applied to the machine learning models.

Similarly classified target vehicles may generate different radar signatures (return signals) when located at different distances or traveling at different speeds. At the same time, target velocity or range may be available from other parts of the radar system. For example, a frequency modulated continuous wave (FMCW) radar may have range information extracted through Fourier transform elsewhere in the system. In other examples, speed may be extracted by phase relations in the radar return signals or through comparison or other operations on multiple return signals from the same vehicles. Thus, speed or range information may be provided separately to some or all of the machine learning system. In one example implementation there may be a feature recognition portion of the model which generates a feature vector (with any number of dimensions) from the radar signal and a separate speed and range classification may be encoded (e.g. one-hot encoded for each of a speed binning and a range binning). The feature vector and the speed and range vectors may then be concatenated (in any order) or otherwise combined before going into a decision-making highly connected final or closer-to-final processing stage. In this way the speed and range signals, which have specific binned meaning, may not be processed by the feature extractors drawing features from the radar trace but still be used within the machine learning model after initial feature extractors.

In some cases, the learning may be performed partially or entirely on multiple networks. For example, one learning network may be trained for each of multiple range bins. Then, during usage, signals may be separated similarly and sent for classification to the corresponding predictor which was trained on similar signals.

FIG. 4A through 4D include illustrations of example architectures for radar classification, arranged in accordance with at least some embodiments described herein.

The architecture of a machine learning system is the particular strategy or principle underlying the connection between layers and the types of layers in use. Layers of a machine learning system are groups of operations that are applied sequentially to incoming data, so layers closer to the original data are applied before later layers. In some cases, the input is referred to as the top layer and other operations are referred to as the bottom layer. It should be noted that multiple layers may be combined into a single step or reordered using principles such as the associative property, the commutative property, the distributive property, or in some cases even the identity property. Some of the most common layer types include following.

Convolutional filters: these layers numerically convolve a filter over the data to produce an output. The weights of the filter and biases may be parameters optimized during learning.

Pooling layers: these layers may reduce the data representation by summarizing a group of numbers in the output to a smaller scale. For example, a Max Pooling layer with a scale of 4 may take each successive set of 4 numbers in an output and record just the maximum number as a single number in a next stage output. This may turn a time-domain record 1,000 samples long into a representation 250 numbers long. Instead of a maximum, pooling layers may use an average, a minimum, or other functions to summarize the details of the previous output. Global pooling is another example, which converts each output from previous filters into a single number per filter (using sum, average, maximum, etc.). In some pooling implementations the size may not represent the entire receptive input field because pooling layers may take non-sequential numbers from a source input.

Dense layers: This is a (nominally) fully connected layer, where each value in the layer is a linear combination of the values from the previous layer or row of the dense layer. The linear combination constants and biases may be adjusted during learning. As an example, a 4×10 dense "layer" may have 4 rows of 10 nodes each. The values at the input nodes are linear combinations of the input values from the previous layers. Each successive row (row and layers may be both used to describe dense layers) is then a linear combination of the values in the preceding row. It should be noted that in practice it is common to pare dense layers down in size by removing connections and relations that have little impact on the final estimation and/or by reducing the size of numerical representations. In some cases, such paring is performed after training by analyzing the computational paths, in other cases some paring may be performed at the architectural level based on known or expected behaviors.

In the example architecture 400A, the data series 402 may be fed into an initial group of convolutions 404, each having a kernel. If there are 20 initial convolutions in this first layer the output may be 20 different series, each generated by performing a convolution on the input data series with a different kernel. In a simple example, if the input data series is 3,000 long and 20 kernels are applied, the output dimensions may be approximately 20×3000. It should be noted that in actuality the output may be shorter than the input by the kernel length minus one (e.g., a kernel length of 3 shortens the output by 2, and a kernel length of 6 may shrink the output by 5), or other configurations of kernels may be chosen to deliberately shorten the output representation. The first group of convolutions 404 may be followed by a max pooling layer 406 to shrink the data. For example, if the first Maxpool size is 6, the 20×3000 output data may become 20×500 in size. The max pooling layer 406 may be followed by a series of convolutions 408 that may include any number of layers (three are shown in the figure) labeled as "Feature gen" 410. The series of convolutions 408 may include various strategies to reduce array size as the layers progress, such as strided layers or pooling layers. In the example architecture 400A, the "Feature gen" 410 is shown leading to another max pooling layer 412, another convolution layer 414, and then a further max pooling payer 416 before reaching global pooling layer 418 that turns each of the preceding convolution filter outputs into a single number (e.g. 20 convolutions turn into 20 numeric values). The output of the global pooling layer 418 may be fed into a dense network 422 (or series of dense layers) to turn the, for example, 20 features into a set of predictive scores for different output classes. The softmax layer 424 is specialized for turning a set of predictive scores into a normalized estimate of classes, and this output may be used as a prediction 426, where the highest value indicates the class predicted (e.g., a high score in the third array value may identify the third vehicle class as the estimated class).

The softmax function implemented by the softmax layer 424, or normalized exponential function, is a generalization of the logistic function that "squashes" a K-dimensional vector z of arbitrary real values to a K-dimensional vector σ(z) of real values, where each entry is in the range (0, 1), and all the entries add up to 1. In probability theory, the output of the softmax function may be used to represent a categorical distribution—that is, a probability distribution over K different possible outcomes. The output may be the gradient-log-normalizer of the categorical probability distribution. The softmax function is used in various multiclass classification methods, such as multinomial logistic regression (also known as softmax regression), multiclass linear discriminant analysis, naive Bayes classifiers, and artificial neural networks. Softmax layers may be omitted or replaced in some cases, as the input to the softmax is already an estimate of the vehicle class.

Figure 4A:
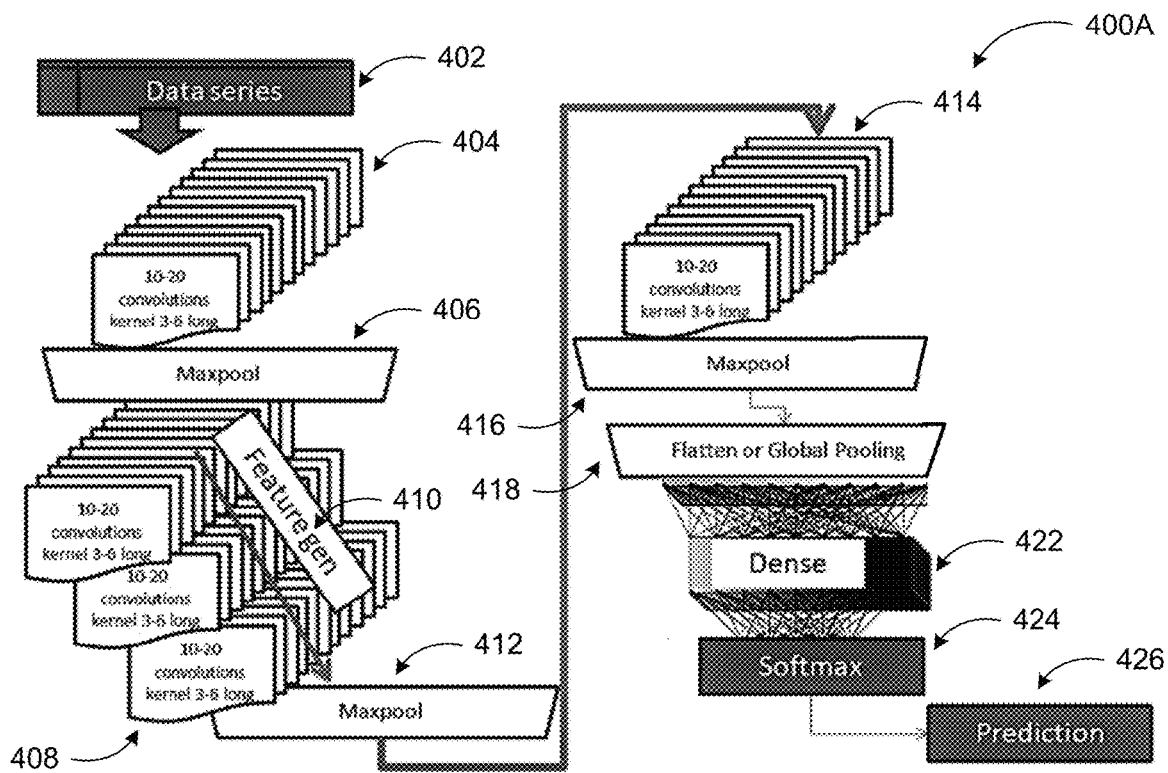
FIG. 4A through 4D include illustrations of example architectures for radar classification.
Figure 4B:
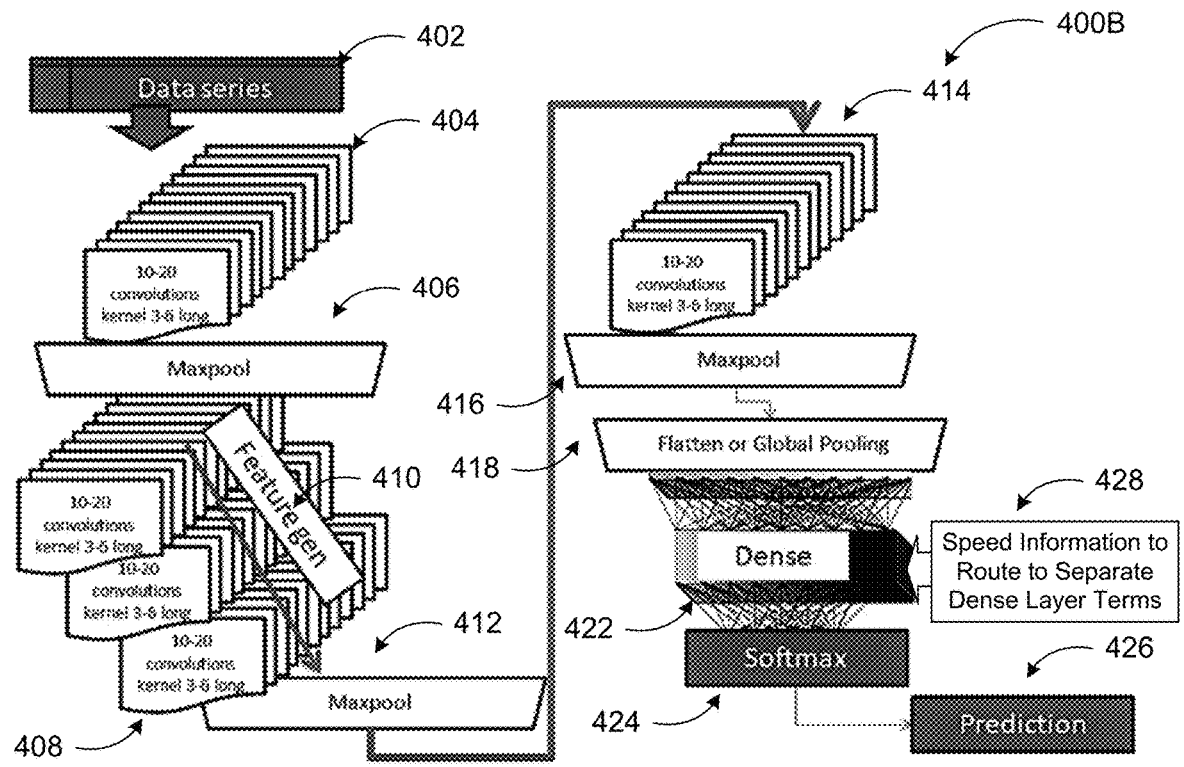

In some architectures the radar signal may be used to separately extract supplemental data for each vehicle event using separate algorithms. These extracted values may be used as separate input features, for example, by inputting them alongside the globally pooled output at the dense layers. Example architecture 400B of FIG. 4B includes similar elements to the example architecture 400A in FIG. 4A with the additional input 428 into the dense network 422 indicating that supplemental data from outside algorithms may be input as additional features at the dense processing layer, speed information is shown in FIG. 4B however any supplemental data may be used. In other embodiments, the additional information may be introduced at other layers of the architecture as well. The additional features may be encoded as numbers (e.g. a speed measurement) or as categorical indicators (e.g. a vector of zeros except for a "1" to indicate which of a series of bins the speed falls into—sometimes known as "one-hot encoding").

Figure 4C:
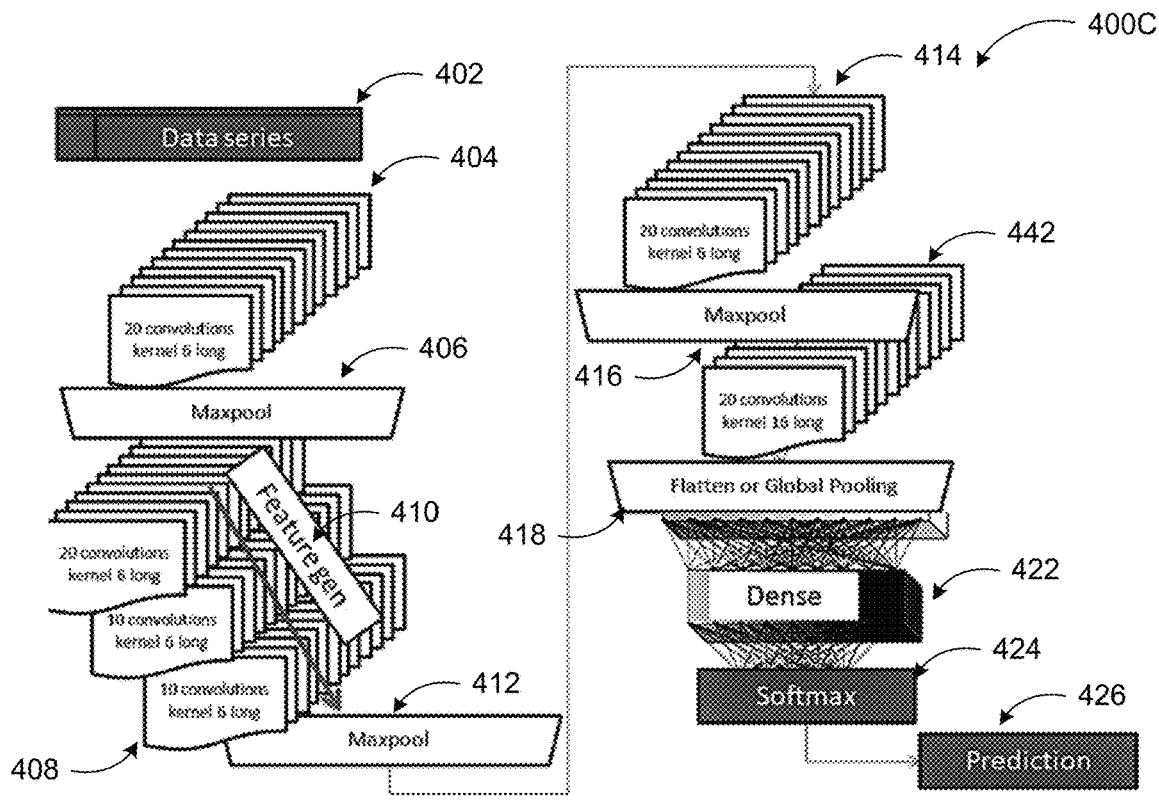

The alternative architecture 400C of FIG. 4C shows an implementation with additional convolution and pooling layers (convolutions 442) as well as variation in kernel lengths. Each convolution layer may have a "stride" value causing the convolution to only be computed once for each "stride" length of values. For example, a stride of 4 means the first convolution starts at index 0, the second at index 3, then index 7, etc. Such strides can be used to reduce the length of the output arrays, among other things.

Figure 4D:
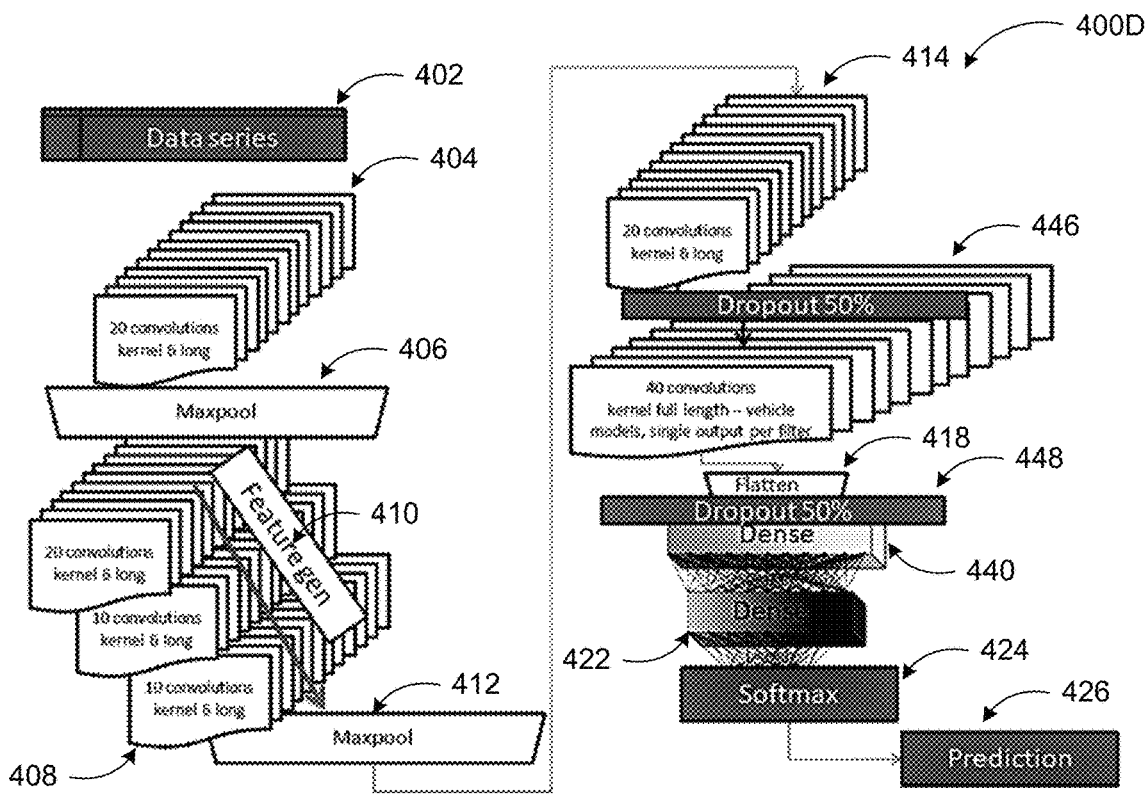

Yet another example architecture 400D is illustrated in FIG. 4D showing one or more dropout layers 446, 448 may be added at different locations within the architecture. Multiple dense network blocks of different sizes (e.g., dense network 440) may also be added towards the end of the architecture. Dropout layers as used here have a probability to drop entire filter outputs/features during each training step as opposed to specific single numeric values. In some cases, dropout layers may be used as frequently as every layer during training.

The number of convolutions and sizes of all arrays may vary not only depending on data as results are found but also based on different segmentation of the data. For example, shorter events may be cut to shorter input arrays by discarding low or zero information segments after the main vehicle event, while longer events may require longer input arrays and different pooling or convolution parameters. In some examples, events that are closer to the radar may produce more and different features for recognition because the radar beam hits a smaller cross section of the vehicle at a time, leading to differences in optimum layer size, kernels, architecture, and number based on range to vehicles.

In one implementation example, the number of convolutions in each layer may be 200, with kernel lengths of 6 toward the beginning with strides of 6 on the first layer as well. Later layers may have 200 convolutions. Dropout may be set to 50% and present at most or all layers, meaning that there may be a 50% chance for each step of training that each convolutions output may be dropped, while the specific convolutions dropped may change at each step. After the final convolution, Global Average Pooling may be implemented, which takes the average of the outputs of each filter previous to the pooling layer. Then, another layer of Dropout may be used, followed by a square dense array of the same dimension as the Global Average Pooling output (e.g., 200×200 if the last convolution has 200 filters), followed by Dropout again and then a Dense layer with the same dimension as the final output (e.g., 8×8 if there are 8 vehicle classes being identified). The final output from that dense layer may be provided into a softmax activation that provides the final estimation. Each of the convolutions may have a Rectified Linear Unit (or "relu") activation, and kernel initialization such as orthogonal initialization, uniform intialization, or glorot initialization.

Additional systems such as genetic algorithms or even machine learning may be used to alter the settings and architecture of the models so that each grouping of data generates improved models. In some examples, these changes result in different numbers of layers, different convolution counts or kernel sizes, different initialization, different dimensions of initial or intermediate vectors, and different connections among such elements for different groupings of data that are formed using supplementary data.

While selecting a particular model based on supplementary data is discussed herein, it should be understood that supplementary data may also be used to select multiple models and the output may be achieved by comparing or blending the output of multiple models. For example, supplementary data may result in the selection of two or more models and the final classification may be the resulting classification that has the highest confidence score or the highest confidence score after summing model outputs. In another example, the resulting classification may be the resulting classification with the most votes among multiple models. Any appropriate multiple-model weighting or consensus approach may be applied.

Figure 5:
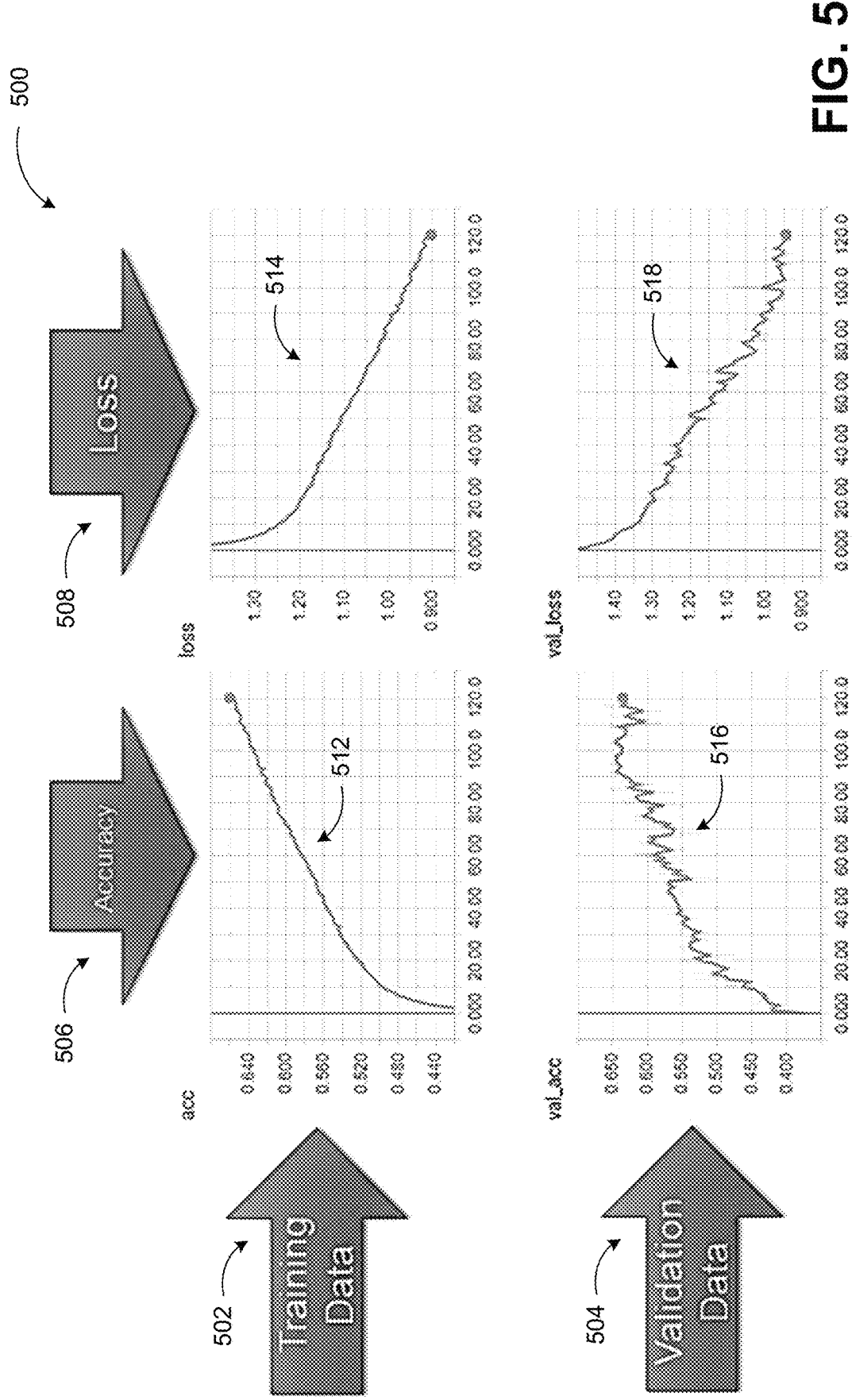
FIG. 5 shows example accuracy and loss plots for both training and validation during a training sequence.

FIG. 5 shows example accuracy and loss plots for both training and validation during a well-behaved training sequence, arranged in accordance with at least some embodiments described herein. The absolute values are not reflective of any product or specific implementation, the charts are selected to facilitate discussion.

Diagram 500 shows four charts that may be used during training. Accuracy charts 506 show the likelihood of each classification being correct, while loss charts 508 show an output of the "loss function" of the overall training process, which may generally be designed to change monotonically as the model improves. Notably, the loss function may be chosen to increase or decrease with model quality (loss function is also referred to as a "fitness function" if designed to increase with improvements). Improvement in model quality is usually dependent on accuracy but also on other values such as the relative certainty of estimates or regularization functions such as increasing loss if the vector norm of various kernels exceeds a certain value. Such quality metrics may help keep models from overtraining (e.g., learning noise in the training set) and to improve stability during the training process. Accuracy and loss plots are visualized both for training data 502, data applied during the learning process and which the machine learning process uses to adjust values within the model, and for validation data 504, which is not used for the training functions. Plots of the performance of validation data 504 are usually more jagged and uneven compared to the training data 502 as the machine learning system may sometimes learn features that are noise in the training data 502 with little or no generalizing classification value. The horizontal axes in the example plots 512, 514, 516, and 518 represent epoch numbers, where one epoch represents one forward pass and one backward pass of some number of training examples (e.g. all the training values, or 10 or 100 or 1,000 training values). Vertical axes have selected scales for accuracy and loss values, with many possibilities to choose from.

Training loss, in successful machine learning operations, may typically be downward, while validation loss can be noisier and/or non-monotonic. The loss provides valuable feedback for adjusting "learning rate", which is an input to optimizer and in the cases discussed herein may be changed to suit different groupings of data. Other forms of evaluation may include evaluating bias distribution, evaluating the gradient of the bias, evaluating kernel values, or evaluating the gradient of the kernels.

Some of the architectures discussed above involve inputting supplemental data such as a lane in which the vehicles are detected (or range of radar), a length of the vehicles, a speed of the vehicles, a height of the vehicles, any obstructions, and/or other attributes as additional features during training. With such inputs the machine learning system may be able to factor the detected supplemental data into class estimation. However, if the features of interest change significantly with range (e.g., due to radar beam fanout or stationary interferers) such added information may not be sufficient or may incur undesirable tradeoffs such as increased model size or computation requirements. Varying results may be achieved in training different models or different feature generation at various layers for events that have different supplemental information. For example, some radar systems may already have algorithms for determining of the supplemental data for vehicle events. A determination may be needed as to whether it is better to train one large model and introduce supplemental information as additional features or to train multiple models on narrower collections of the data as separated using the supplemental data.

Figure 6:
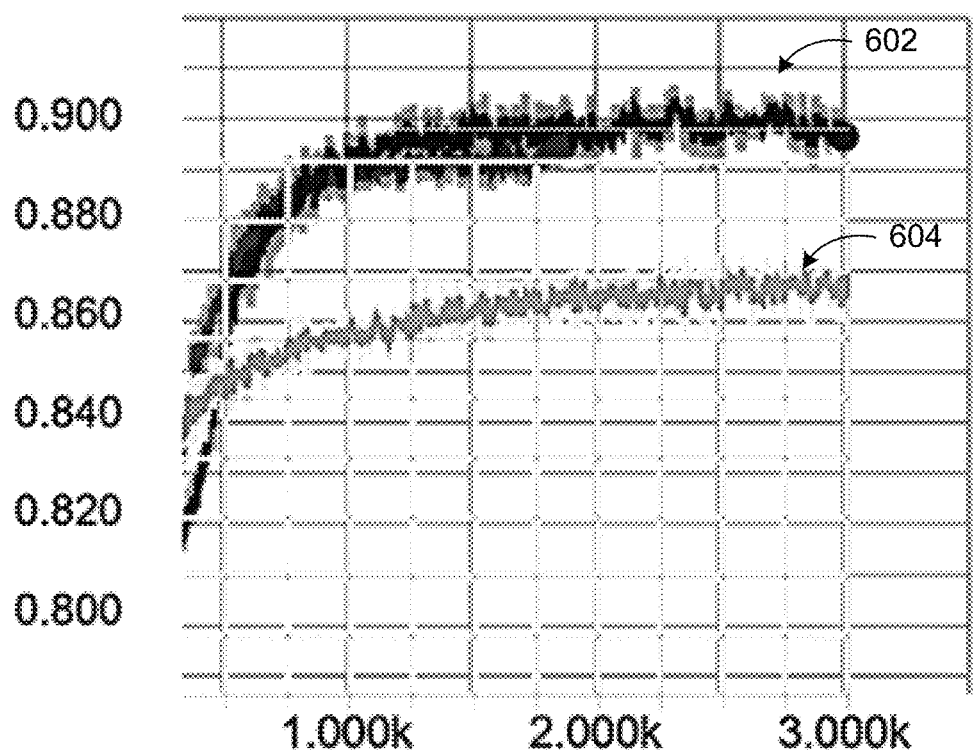
FIG. 6 shows validation accuracy for an example highway radar data collection.

FIG. 6 shows model training validation accuracy for an example highway radar data collection, arranged in accordance with at least some embodiments described herein.

In some embodiments, training may take into consideration the fact that if each of the highway lanes (e.g., 3) is trained separately, for example, fewer (e.g. approximately one third as many if there are three mostly equal lanes) events may be available on average for separately training each lane. In an example implementation for testing the trade-off, an actual highway dataset may be used for training a model with only short (approximately car-length) events from a single lane, versus three adjacent lanes centered on the original lane. In such an example, approximately 90% accuracy may be achieved on the validation data for a single lane but only 86% for similar models on the three-lane data. Thus, the additional two lanes of data for training may not provide sufficient additional model value for this particular scenario to maintain accuracy in light of the changes in features for even adjacent lanes. The results may be different for different radar angles, ranges, and installations, and the techniques described herein may be used with or without various levels of training data separation.

Diagram 600 shows validation data (data not seen by the training calculations during training) testing at epoch numbers listed along the x-axis. The y-axis represents accuracy. Plot 602 represents models trained on a single lane of data and tested only on events from that lane (as identified by supplemental information available from radar calculations) and scores 90% accuracy. Plot 604 represents the accuracy of 3 lanes of training data evaluating events from any of the three highway lanes. In this particular configuration and setting, reducing the training data by training with only a single lane's events still produces better results when used to evaluate events also from that single lane.

In some examples, the conclusion may be different for different lanes. For example, if the farthest away lane (from the radar sensor) is the most accurate when trained only with the data from that lane, then a model may be produced for evaluating only events in the farthest away lane using data examples from only that lane. Meanwhile, a closer lane (to the radar sensor) may be found to be most accurate if the events from the closer lane are evaluated against data originating in both lanes (in other words, the increased data population may improve the closer lane results despite some of the training data being from the farthest away lane). In this case, the closer lane estimation model may be generated using data from both lanes but be used only to estimate the class of events in the closer lane.

The separation using supplemental data may also be performed along other properties. For example, it may be advantageous in some cases to group data by speed. Thus, radar events may have their speed evaluated using other algorithms external to the machine learning model and then use only events in a certain speed range for training and use that model to evaluate new events within a particular speed range (where the speed range may be the same as the training speed range or different). In one example, highway radar event data may be separated for each lane into bins for speeds from 5 mph to 25 mph, 25 mph to 45 mph, 45 mph to 65 mph, and above 65 mph. The bins may be overlapping or exclusive. Another example property available from supplemental data may be vehicle length. Other examples of available supplemental data may include detected interfering objects (e.g. metallic highway centerline dividers), whether or not vehicles are in adjacent positions, energy levels of the event, synthetic aperture phase values, weather conditions (e.g., rainy or clear weather models, hot or cold weather models, etc.), or any other property that can be computed separately from the machine learning system. In some cases, the supplemental data may itself be estimated or clarified using a separate machine learning model from the class estimation model. In some cases, supplemental data may include information on target trajectory and motion, for example information about the target being detected in multiple sensors or information about a vehicle decelerating and stopping or not (e.g. a radar at a stop light gathering data as vehicles approach may receive supplemental data about light status or from a separate system that estimates whether a target vehicle stopped or not).

FIG. 7A through 7D include example accuracy versus training step plots for a variety of different model configurations, arranged in accordance with at least some embodiments described herein.

Referring back to the model discussion above, the notion that different model configurations may be appropriate for different data segments may be revisited and models for a given subgroup of data may be manually or automatically trained. For example, FIG. 7A through 7D show training accuracy and validation accuracy for the events identified by supplemental data as 45-65 mph traffic in lane 8 that is shorter than a certain threshold (long enough to include pickup trucks and vans but short enough to exclude most cargo trucks). This allows exploration of the best model for that particular segment of the data.

Diagram 700A includes training data accuracy plots 702 and validation data accuracy plots 704, where y-axis represents accuracy and x-axis represents training steps (in arbitrary epochs) for a variety of different pooling values 706 for different layers. The pooling values are shown as a list surrounded by brackets so that, for example, [3,2,2,2, None] may indicate pooling over 3 numbers and with stride 3 on the first effected layer, 2 numbers and stride 2 on the second through fourth effected layers, and no pooling ("None") on the fifth effected layer. These variations may also be within a model that has additional layers that are not being varied. In this example scenario, for this particular subgroup of data, pooling values of [3,2,2,2, None] result in both the fastest training and the best validation (and test) accuracy. Different pooling values may be selected via such sweeps for different groupings of data to produce different models optimized for different data segments.

Diagram 700B includes training data accuracy plots 712 and validation data accuracy plots 714, where y-axis represents accuracy and x-axis represents training step (in arbitrary epochs) for different configurations of training variables learning rate and momentum 718. Sweeps of meta-variables like learning rate and momentum may also be performed to find the best results for each grouping of events. Over-optimization of meta-variables with knowledge from the validation data may carry a risk of imputing knowledge from the validation data but may still yield useful information if performed carefully. For example, such sweeps may help select settings to speed convergence. Loss plot 716 illustrates the loss for the presented configurations.

Figure 7A:
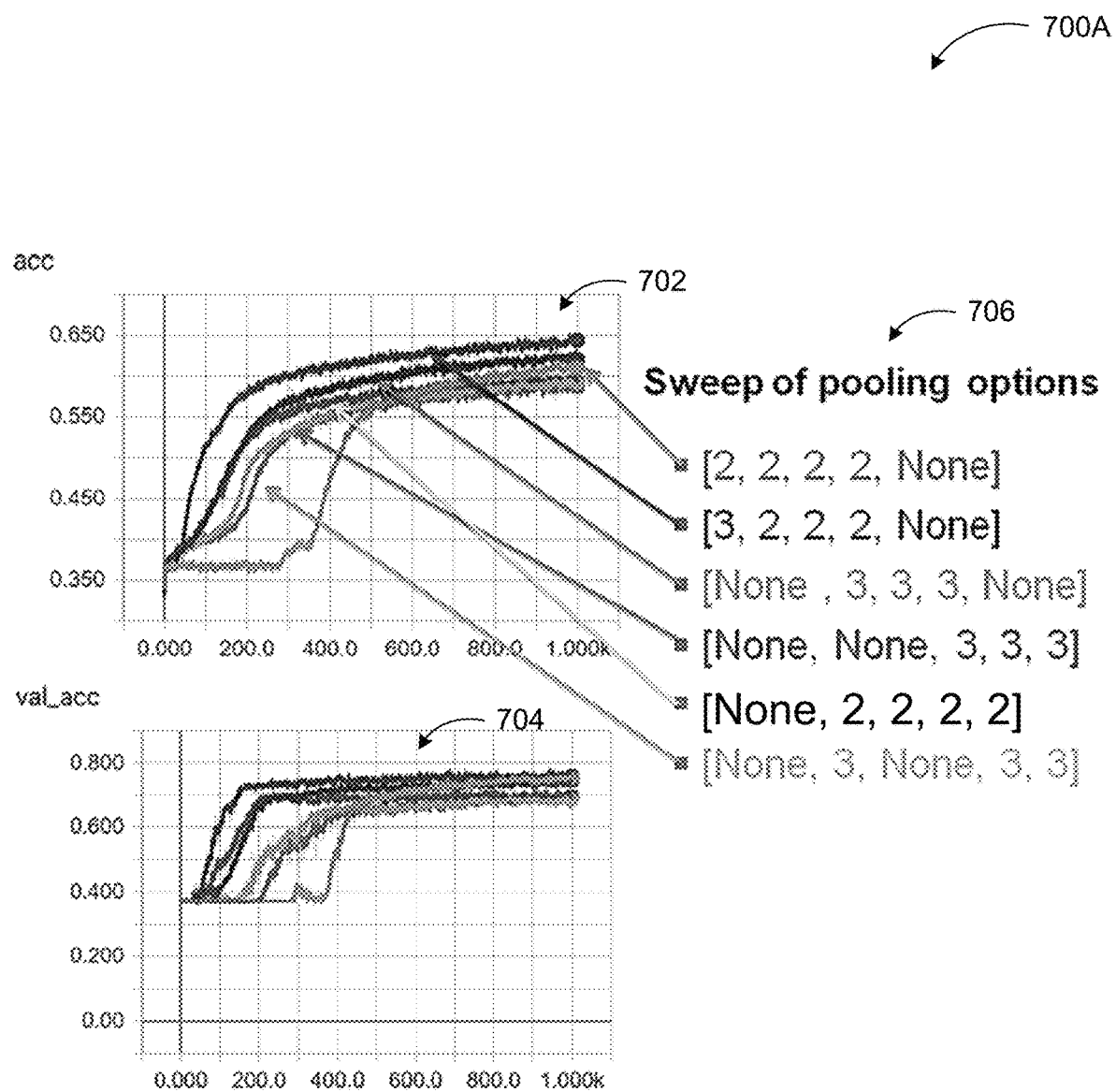
FIG. 7A through 7D include example accuracy versus training time plots for a variety of different layer and parameter configurations of radar classification models.
Figure 7B:
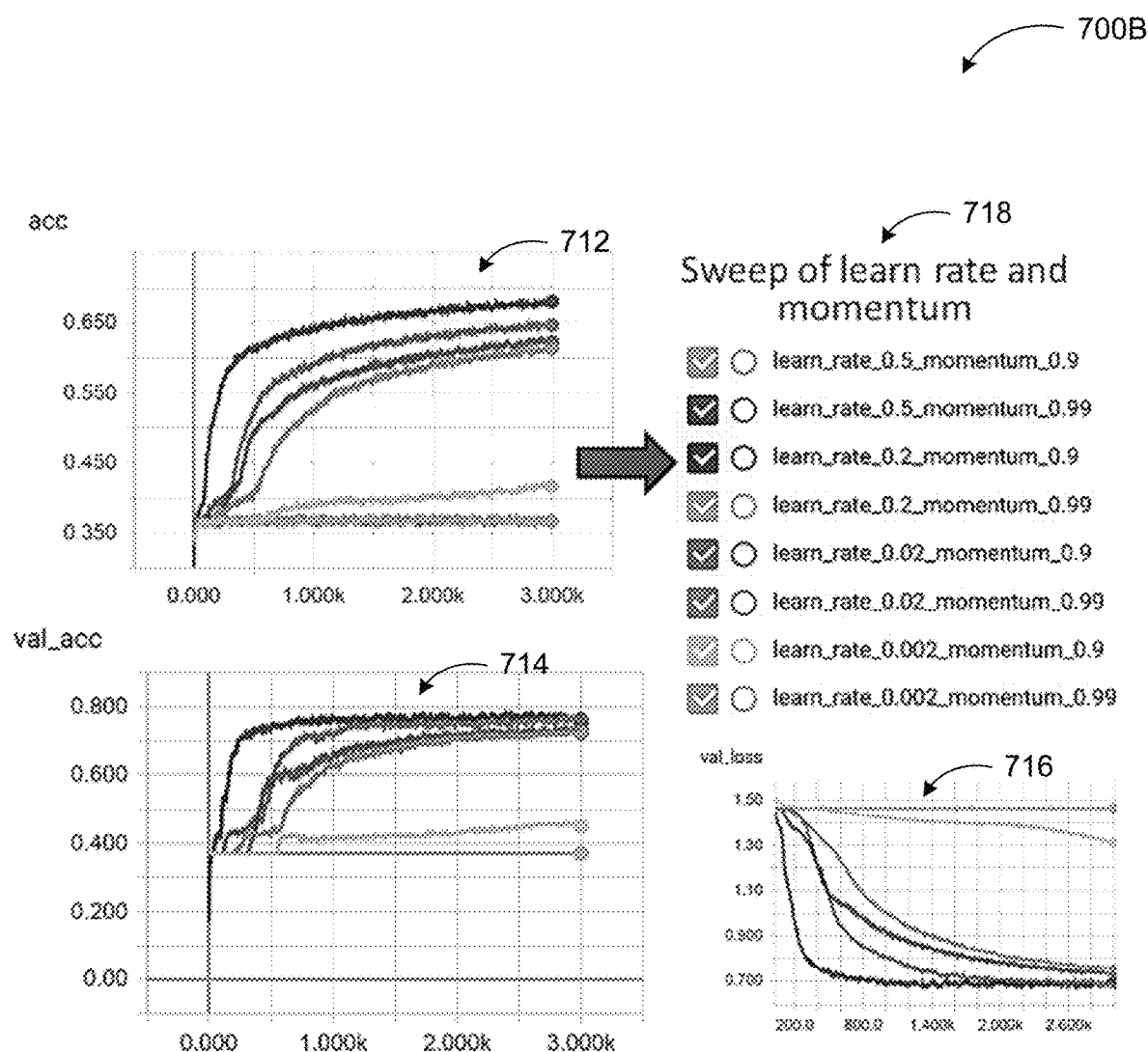
Figure 7C:
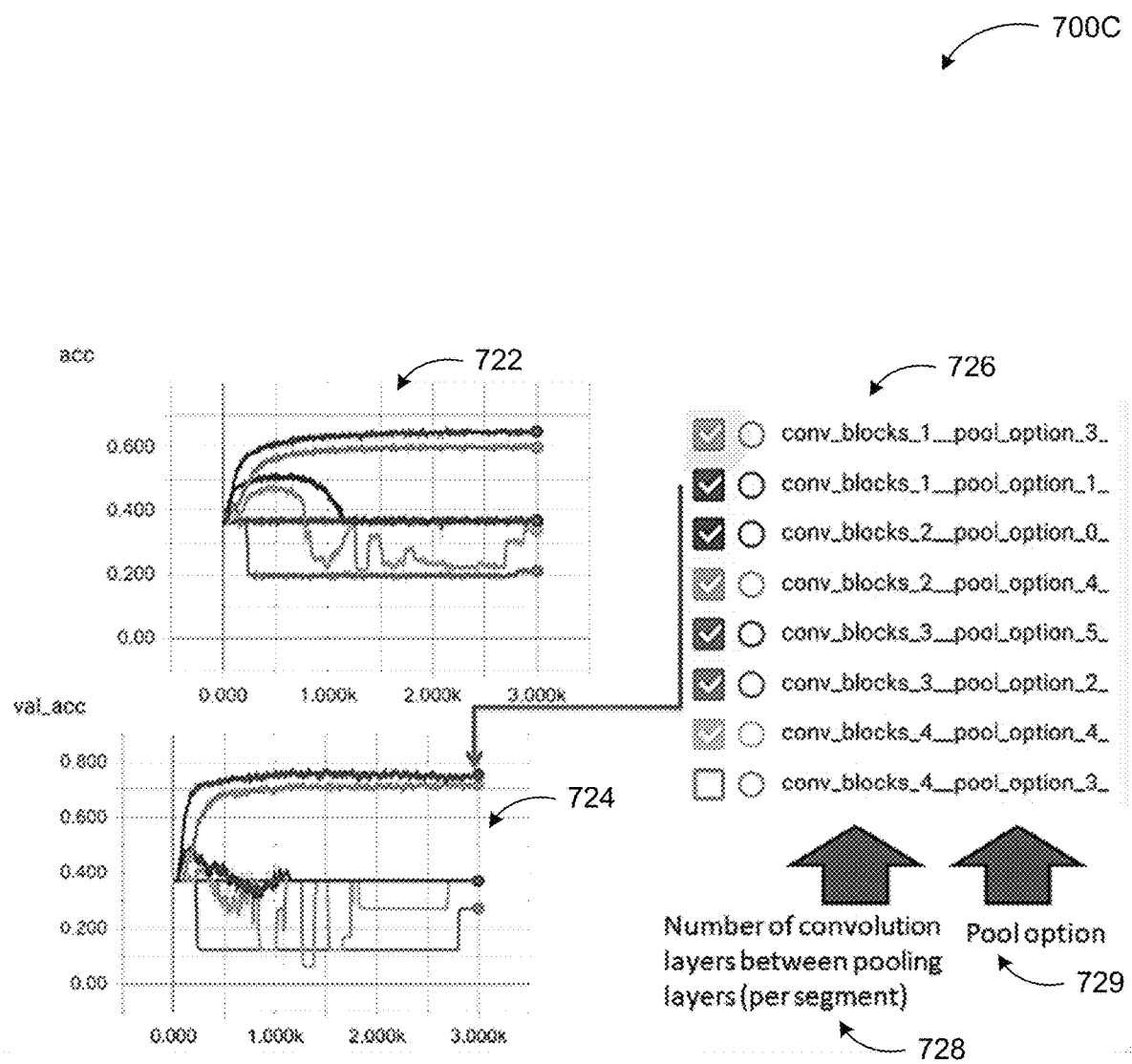
Figure 7D:
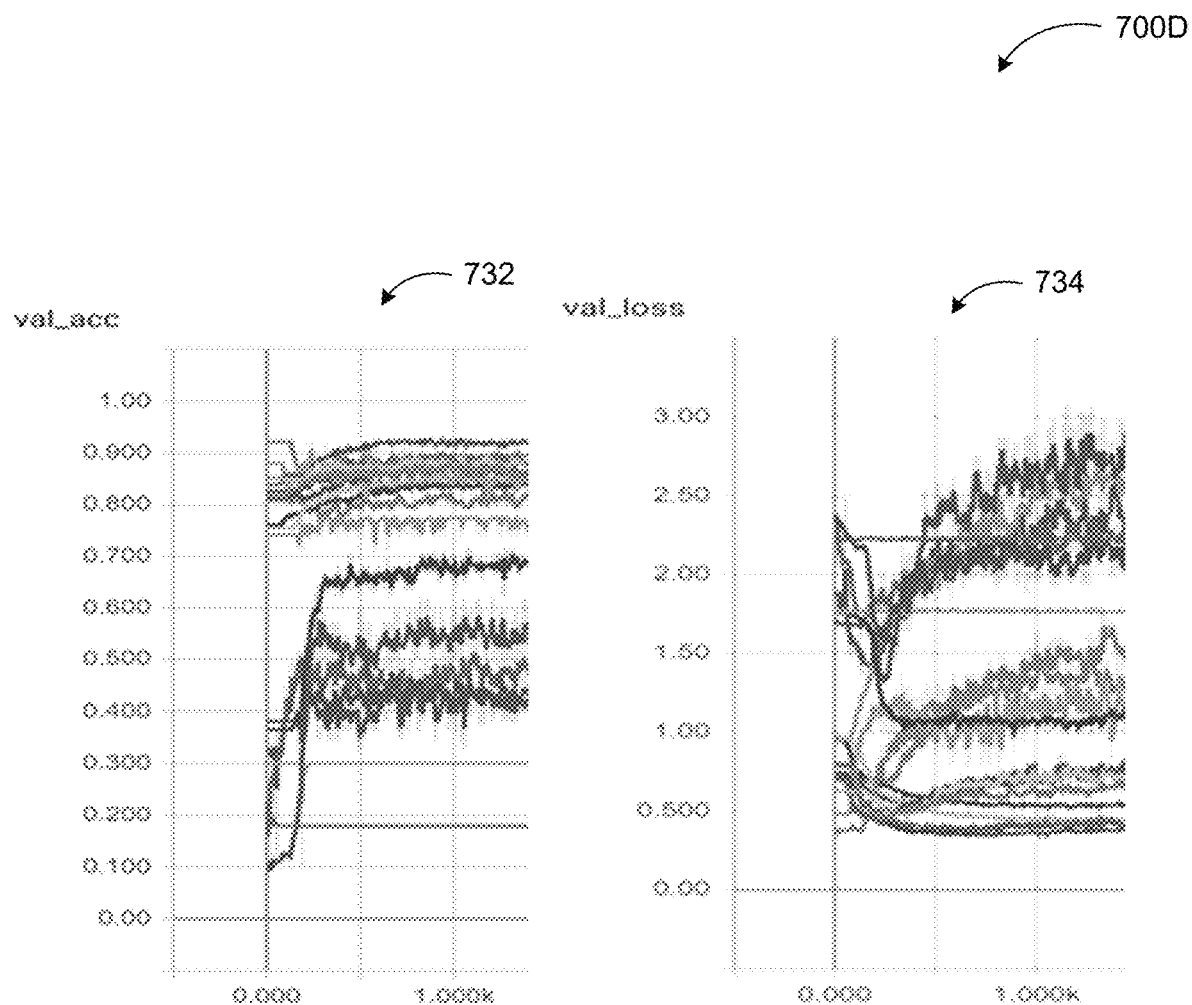

Diagram 700C includes training data accuracy plots 722 and validation data accuracy plots 724, where y-axis represents accuracy and x-axis represents training steps (in arbitrary epochs) for different configurations of possible models 726 for a single grouping of data. Sweeps of possible models for each grouping of data may include varying the number or types of operations are used in the layers. Diagram 700C shows learning data for a different number of convolutional layers 728 combined with different pooling options 729 (e.g., as shown in FIG. 7A, 7B). The variations in FIG. 7C are just one example of varying architecture for different groups to find the best model for each segment of the data. The plots show that some models are even unstable during learning for this particular dataset.

When training for a particular grouping of data (e.g. a group of data with similar supplemental data) an automated approach may be used to test many different architectures. Care may need to be taken not to allow such testing of different arrangements to have the effect of imputing validation data into the system, for example by having another portion of data for testing the meta-impact of architectures (e.g., dividing data into training, validation, and holdback portions). In some examples, the training system may automatically sweep through a range of architectures (e.g. with different layers counts, kernel sizes, filter counts). In some examples, the training system may use genetic algorithms, adaptive growth of neural networks, ensemble or boost approaches (e.g., AdaNet) to generate and iterate through different model architectures to find appropriate models for particular data grouping.

Diagram 700D includes validation data accuracy plots 732 and validation data loss plots 734 for different data groupings on the same architecture model. In an example implementation, training approximately 48 different data groupings on the same architecture model may produce substantial differences in performance and trainability. In some examples, training the different models with different learning data may be sufficient. In other examples, changes may be made either at the training stage or in model architecture. This illustrates that different models for different data groupings may benefit from different structure and configuration.

Where real radar data is used for training, training data needs to be gathered before training can be accomplished, although additional incremental training can be performed with new data that is collected after initial training. For optimal results, training data needs to be gathered under similar conditions as expected to be present during estimation, although the amount that angle, range, or background changes impact classification may be system dependent and some training data may also be generalizable. In some conditions, the radar sensor may be moved or realigned to gather additional data, for example, if there are few vehicles in a particular range bin (e.g., lane) the radar may be moved such that the range bin with less data is matched to a range to the radar with many vehicles to gather more radar events in the low population range bin. In such an example, the machine learning system may have much more training data for the ranges that have little traffic once the radar is returned to the operating position. Moving the sensor may also be used to generate data for different angles and perspectives in addition to ranges. To gather further training data, additional sensors may be placed at different ranges and views in some examples such that a single vehicle passing by may provide data for a plurality of views and/or ranges. In other examples, a user interface may be configured to display which conditions or scenarios need more data to help installers and implementers gather sufficient data. In one example, the amount of data gathered in a particular data segment (e.g. separated using supplemental data) may be compared with a desired amount of data to inform the user where more data should be gathered. In another example, the feedback about data sufficiency may be evaluated by training one or more models and evaluating their performance and recommending more data based on lower classification performance. Recommendations to gather more data may indicate ranges, speeds, lengths, angles, detection sensors, sequence of positions within a sensing area, or other supplemental data, conditions or modifiers.

In one example, data may be gathered by capturing video while recording radar events and then using humans (and/or image processing systems) to label each event based on the true class and location of the vehicle as visible in the video footage. This does involve matching the video and radar event timing, which may be accomplished using an absolute time reference, periodic synchronizations, or based on analysis of the events seen in radar as compared to a sequence of events visible in the video. In some cases, generating a reference event in both the radar and video may be performed on purpose for the benefit of data gathering, e.g., moving a metal object in front of the camera and radar generates a recognizable event in both. Gathering this data may involve additional equipment. For example, classification features may be desired to be active when installing a highway radar unit. Existing models may be tried, such as existing models trained at similar ranges, incident radar angles, or with similar interfering reflectors (e.g., center medians). Existing models may be evaluated in an ad-hoc fashion or labeled data may be collected and systematically compared to model estimates from the labeled events. In some cases, it may be found that some or all of the models may benefit from installation specific training. In that case, gathered events may be grouped based on supplemental data and used as a group to train a model specific to that segment of events.

In typical scenarios, different amounts of training events may be available for different classes and for the different segments determined by supplemental data. In some examples, it may be beneficial to identify segments or segment-class combinations that may have too few training events to produce a high-quality estimation model. In other examples, a lower quality model may be acceptable, and the lower quality model may be used for certain combinations of supplemental information or may be replaced or augmented with a flag that identifies it as poor and triggers appropriate response in the overall system. For example, the lower quality model cases may result in a flag indicating inability to estimate instead of an estimate, or in another example, the poorly modeled cases may emit an estimate but identify them as having low confidence. In further examples, the training process may include identifying segments with insufficient data to allow interventions, for example, acquisition or labeling of more events.

Trained models based on segmentation by supplemental data as well as installation information may be stored and selected from in order to generate multiple classification models. In some examples, the different models may be trained with events from different or multiple sites and data gathering environments. For example, if a new radar is installed at a particular angle and range, it may be prepopulated with models trained based on data from other highway radar installations that have similar angle and range. And if that new radar also has an obstruction or reflector that is unlike previous installations that have similar angle and range, some of the segmented models may be based on other highway radars that have similar obstructions or reflectors even if those models were developed with different angles or ranges. In such a case, a group of models may be selected from previously segmented model training, in some examples, even if the group of models ultimately represents multiple different data gathering sessions or environments.

When training machine learning system, it may be desirable to have as much data as possible, for example, in vision algorithms being trained to recognize objects in photos, a practitioner may make copies of the photos with pixels rotated different directions or with different light levels. Neither of those alterations apply to highway radar data. Alterations used to make copies of data for training should not change the features that a machine learning system according to embodiments needs to recognize while properties that a machine vision system should ignore may be changed. Thus, transformations may be applied to the original radar data in ways that the desired resulting system should ignore as a way to get more data to train the system with extra data from truly important features. The system may generally ignore the fine absolute timing of the shapes in the radar, for example, so the input time data may be slid a few time increments forward or back. In a further example, a single time-series may be selected, and copies may be (dynamically or statically) generated that are advanced in time by 1, 3, 6, and 10 time units and also delayed in time by 1, 3, 5, and 10 time units to effectively result in having 9 times as much training data. Any empty entries may be filled with zeros, a mean, random data, by wrapping around data from the other end, or may simply result in signal truncation. This data increase may still include the meaningful structure of each observation while preventing the machine learning system from memorizing noise spikes at specific time increments. The example time units given above are meant to be illustrative examples only, other time values may be used and in some cases the transformation may be selected to be one-sided (e.g., by selecting to advance the data only to prevent having to generate filler data).

Some radar systems may have multiple receive antennas. This may provide multiple related data sample series for some or all vehicles. The multiple signals from the antennas may be used separately to provide additional perspectives at system training time. For example, if each vehicle results in a received signal at two antennas, this may be treated as two separate time series to generate twice as many training samples. In other examples, multiple channels of data may be used together to generate a single event data sample with more data in the single event. Thus, multiple antenna data may be used concatenated or in an array (e.g., aligned in the time domain to some degree). Similarly, the data may be used in a form computed from the inputs between the more than one antennas such as a phase comparison, a difference signal, or a correlation signal. For example, two signals received from two antennas may be correlated in time to provide a correlation signal that may enable the extraction of features related to the speed of a passing target vehicle.

Data may be presented during training or estimation as amplitudes, phases, complex numbers, etc. In some examples, complex numbers may be handled by concatenating the real and imaginary portions and adjusting the number and/or size of processing blocks to handle the added size. In other cases, complex numbers may be handled using computations in the layers that can handle each complex number as a single value.

Dropout may be used in training a radar system according to embodiments. Example implementations may include removal of some of the connections between computational units during training so that training is performed on a series of "thinned" networks with fewer connections. Then, during evaluation the "unthinned" network (or a permanently selected portion of the unthinned network) may be used for evaluation (along with magnitude corrections to correct for the changed number of units). Such an approach may reduce overfitting and offer training advantages over magnitude-based regularization alone. Overfitting may result from training for too long. An indication of overfitting is the validation set accuracy getting worse, while the training set accuracy continues getting better. The computations may be performed using dropout or inverted dropout, which are alternative implementations toward the same system behavior. Other training modifications may include injecting noise at various levels, putting an optimization cost on various evaluations of filter or convolution variables such as numeric norm values to reduce the impact of large values, batch normalization, and other forms or replacements for regularization.

In some examples, computer vision may be used to help classify data by collecting video synchronized to radar data and using a computer vision system to classify data which in turn may be used to train a radar-based classification system. This may help generate larger amounts of training data compared to manual labeling.

In some examples, combined video and radar data may be used to train a video-radar based classification system. This classification system may use the synchronized video images and the radar data for classification. This model may enhance the overall performance of the system.

In other examples, combined video and radar data may be used to train a video-radar classification system, where a selected sub-image of a video image corresponding to the selected lane on the highway may be used. This process may enhance the computational speed of the classification system.

Training labels for radar data may also include condition modifiers to help the training system understand differences. For example, a full pickup truck and an empty pickup truck may look substantially different to a radar system. If the data is pre-labeled with such differences, it may help at training time to further organize the differences seen in radar data, which may otherwise be within a single label.

Figure 8:
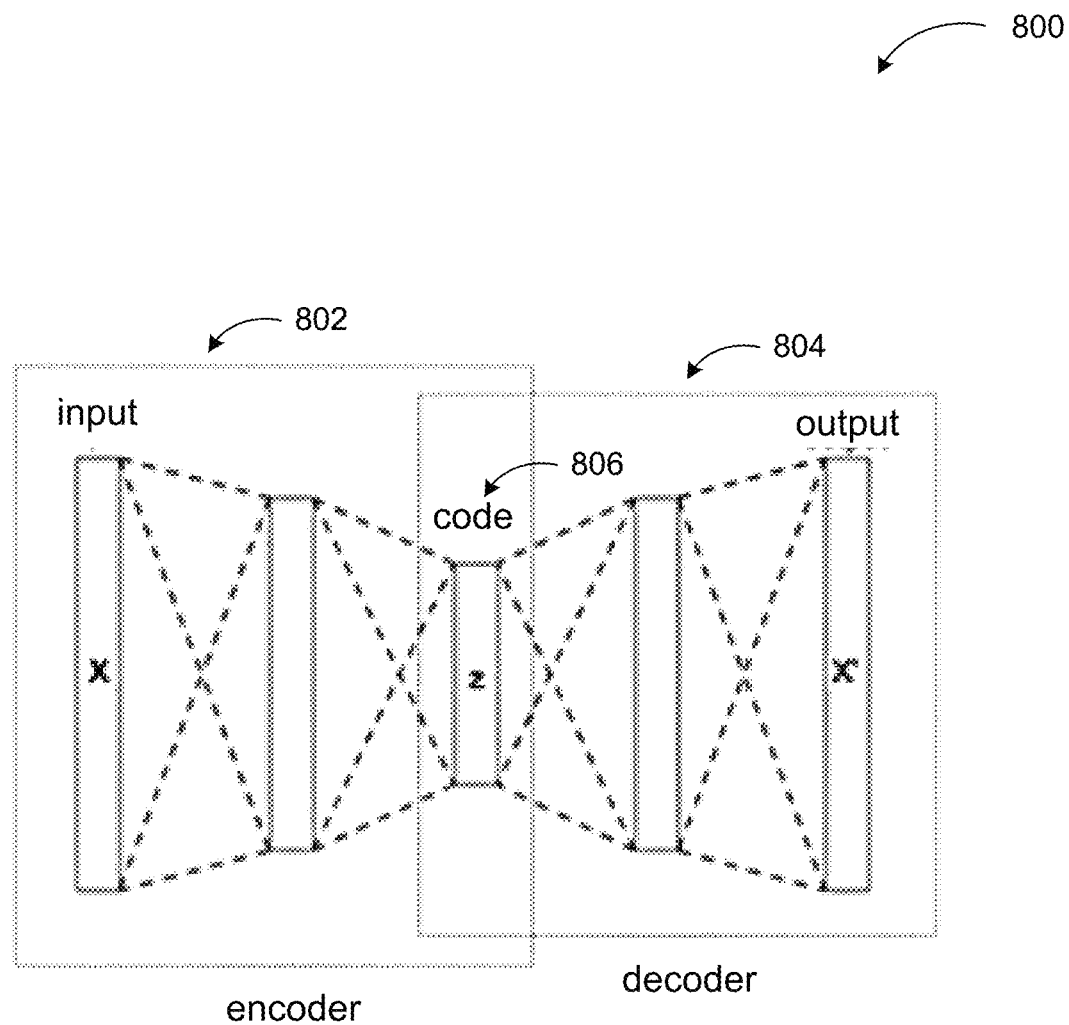
FIG. 8 includes a conceptual diagram of an example auto-correlator/denoiser architecture.

FIG. 8 includes a conceptual diagram of an example correlator/denoiser architecture, arranged in accordance with at least some embodiments described herein.

In some examples, the radar signal may be preprocessed by phase correction. Due to the recurring oscillations of electromagnetic waves, some radar images may be improved by altering the phase of neighboring samples in a collection of radar inputs using a phase adjustment template. This phase adjustment may be performed by pre-calculating phase correction templates based on range and speed. For example, a collection of phase templates matched to the range of particular signal returns at various speeds may be applied to the incoming data and the best speed match determined by minimization of entropy or another signal quality metric. In other cases, both speed and range may be available as supplemental data and pre-computed or dynamically computed phase correction matched to the speed and range may be applied. In some cases, the phase correction array may be computed in accordance with synthetic aperture radar principles. Since the target is moving and the radar stationary for highway traffic sensor radars, those scenarios may also use inverse synthetic aperture principles.

In some examples, the radar signal may be preprocessed by phase correction or denoising using machine learning models. A denoiser or preprocessor may be trained by using an autoencoder-type training structure with noisy inputs and comparing the outputs to ideal (or less noisy) reference signals. Diagram 800 shows an example architecture of an auto-correlator/denoiser, which may be used to train a denoiser or preprocessor. The input may be processed by encoder 802 and subsequently by decoder 804. The denoiser/preprocesor may be trained using either synthetic data or data with added noise. The signal with added noise is applied at the input and the output is compared to the ideal or lower noise original signal. The difference between those two signals is a loss value that the model is trained to minimize, resulting in a machine learning preprocessing model that takes a raw or noisy signal as an input and outputs an improved signal. Such a preprocessing model may be used separately and independently of the classification model discussed elsewhere herein. In some cases, the preprocessing model may be used before supplemental data is generated by a radar system, in other cases the preprocessing model may be used before the classification model(s). In some cases, a preprocessing model, after training, may be reduced to just the encoder section 802 and the classification model may be trained to classify based on encoded representation 806 which is output from the encoder portion of the preprocessing model.

In another example of preprocessing, a preprocessing unit 800 may be trained using the inputs from multiple radar receivers to generate a single encoded representation 806. Such a preprocessor may then be used to take the input from multiple radar receivers and convert them to a single combined encoded representation 806, which may then be used both for training and estimation at the classification model.

Figure 9:
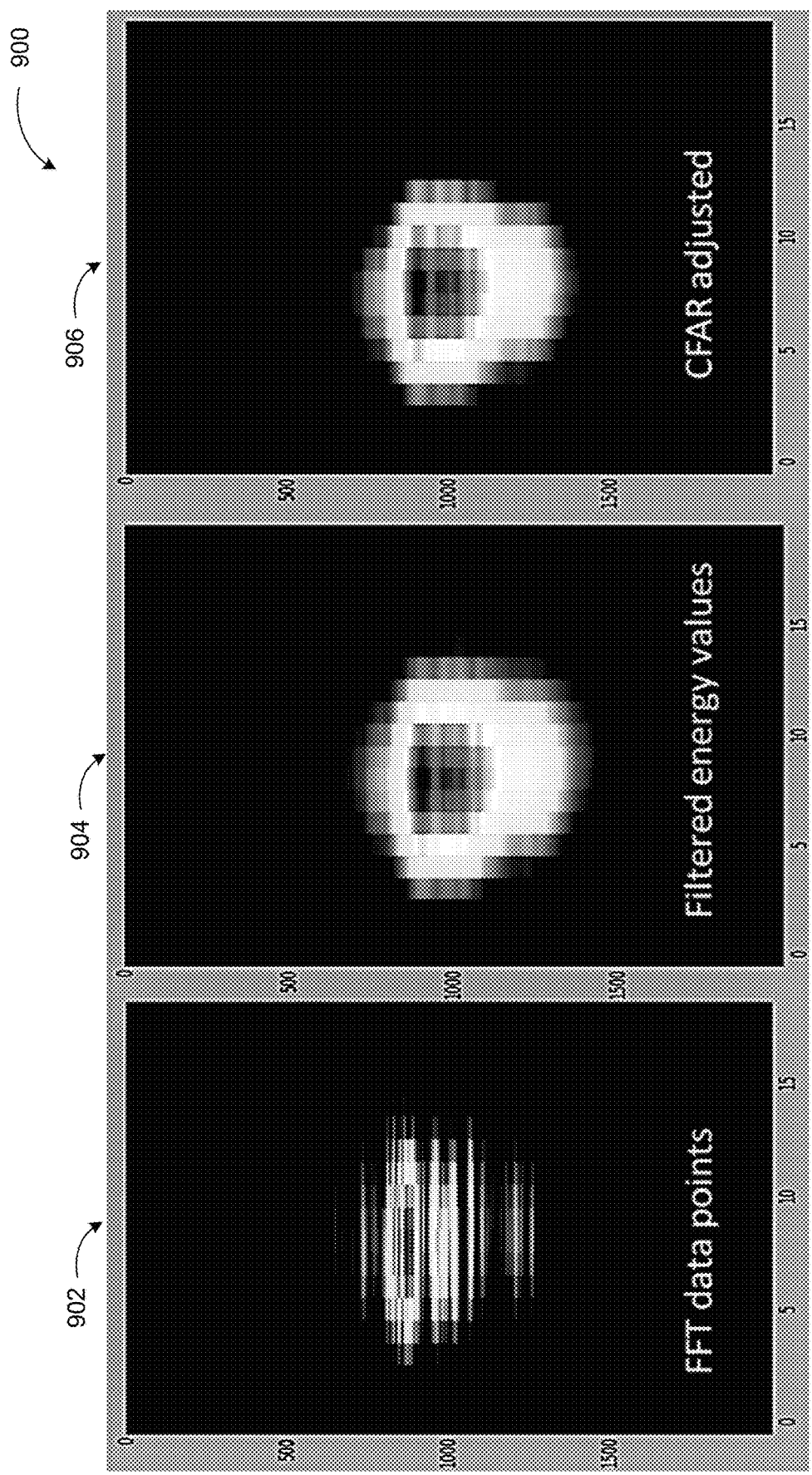
FIG. 9 illustrates 2D radar data, collected through an example FMCW radar system and sampled with various preprocessing approaches.

FIG. 9 illustrates 2D radar data, collected through an example FMCW radar system and sampled with various preprocessing approaches, arranged in accordance with at least some embodiments described herein.

In some embodiments, 2D or radar image-based processing may be employed using the principles discussed herein. Diagram 900 shows example 2D radar data, collected through a FMCW radar system and sampled with various preprocessing approaches. Vertical axis is time and horizontal axis in range in the diagram. Data in image 902 is an example of the range being determined using FFT based techniques on the FMCW data to generate 2D data. Data in image 904 is an example of some filtering performed. The data in image 906 is an example of additional constant false alarm rate (CFAR) processing being performed to remove some of the background signal that does not represent the target vehicle. In some examples, plots 1102 and 1104 may show some realizations for at least some event data as it may be presented to the classification model. In some cases, processing may be performed on a larger (e.g. 1D, 2D, or 3D) view representation to separate out single or multiple events that may occur (e.g. separating targets at different ranges and/or times) and event data may be gathered together based on this separation step. For example, a view similar to diagram 900 may contain signals returned from multiple vehicles and those vehicles may be separated by additional processing into separate events.

Figure 10:
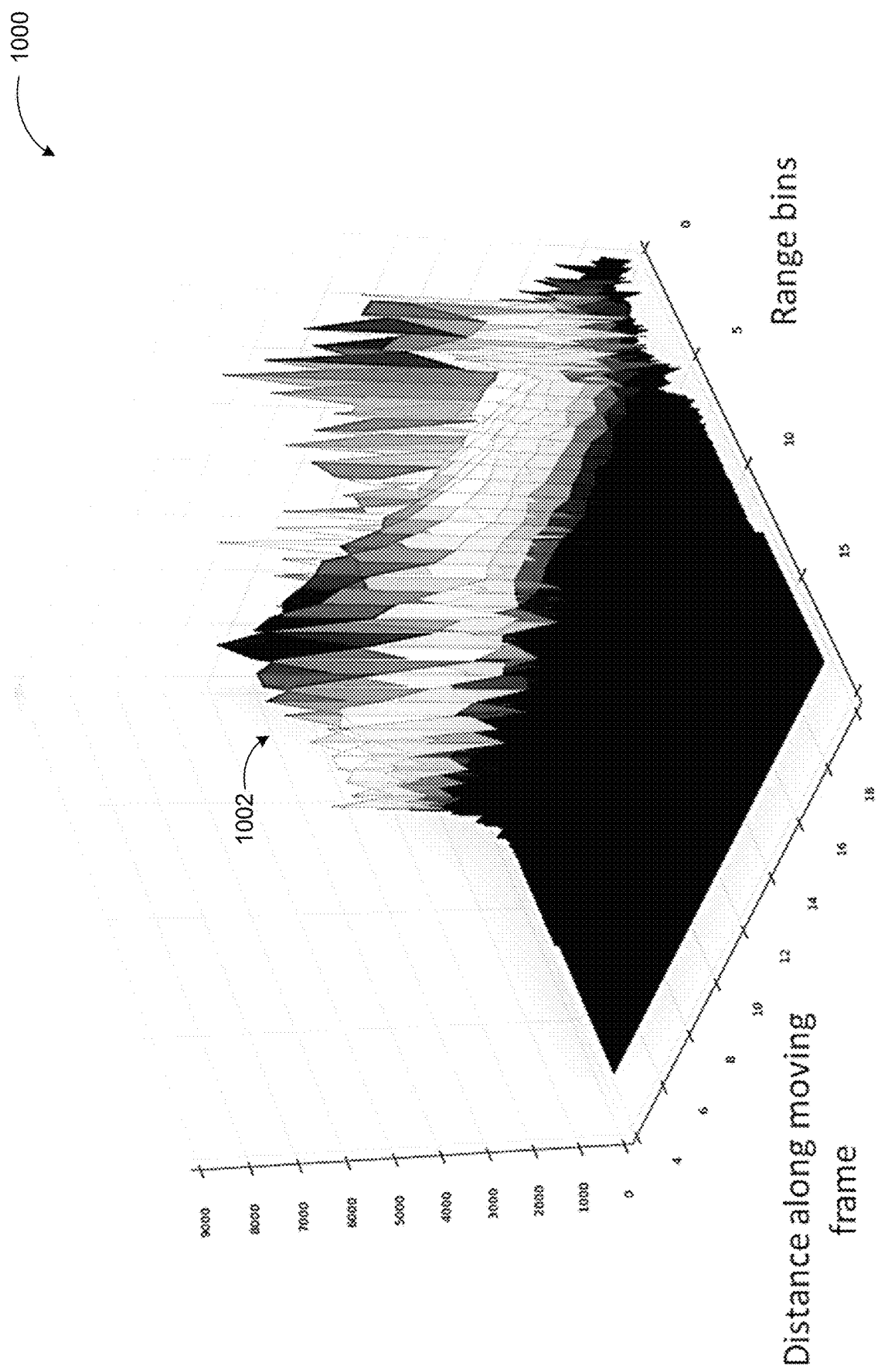
FIG. 10 illustrates another visualization of the amplitude (height) for various range bins and distance along a moving frame of reference.

FIG. 10 illustrates another visualization of the amplitude (height) for various range bins and distance along a moving frame of reference, arranged in accordance with at least some embodiments described herein.

Diagram 1000 shows three-dimensional (3D) plots 1002 visualizing the amplitude (height) for various range bins and distance along a moving frame of reference, which may be seen as time for a single sensor recording amplitude versus time as a vehicle passes. The units in the diagram are arbitrary magnitudes. The images in FIG. 9 may be top views from the surface of the visualized plots 1002 in diagrams like diagram 1000. In some examples, plots 1002 may show some realizations for at least some event data as the data may be presented to the classification model.

Figure 11:
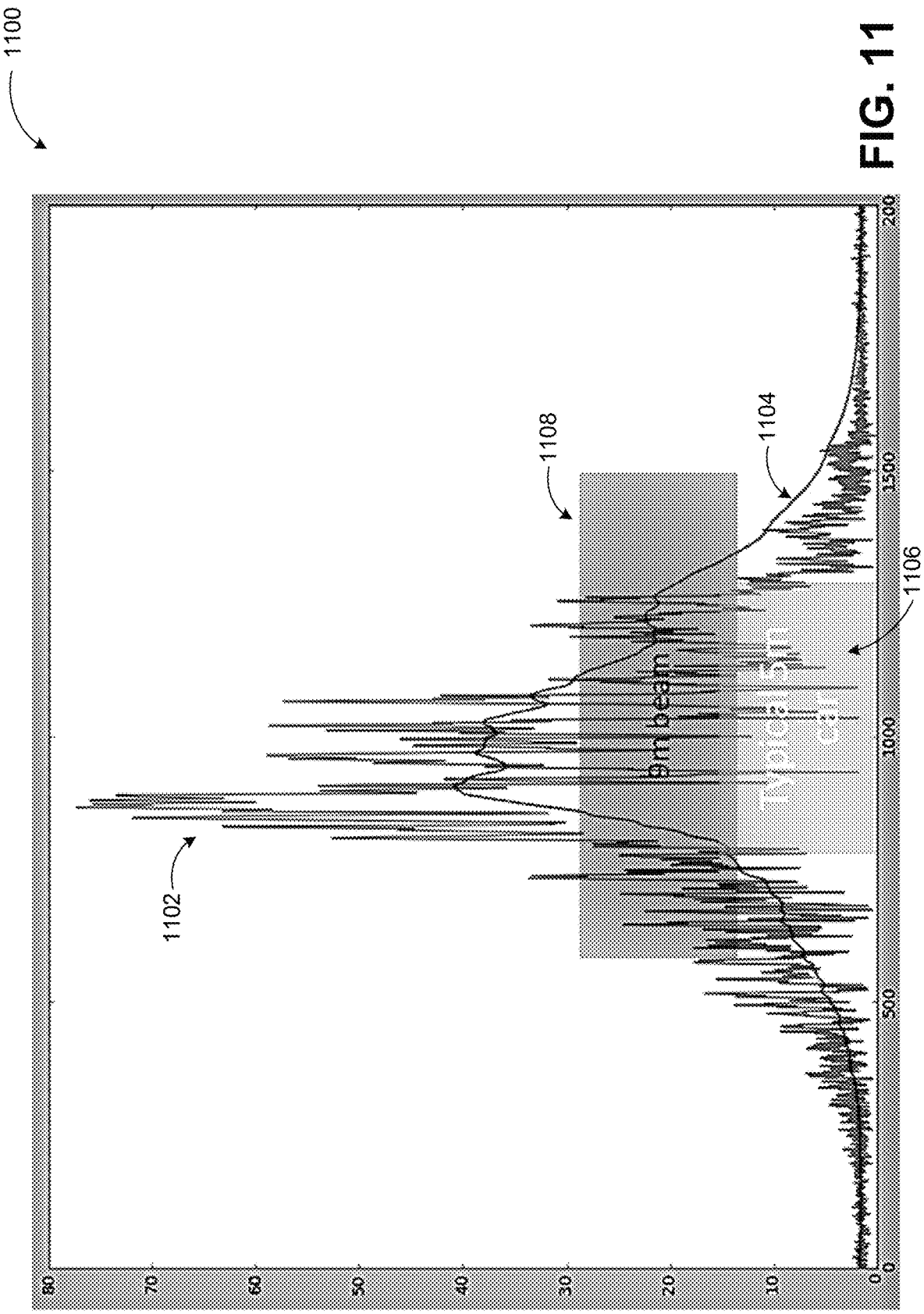
FIG. 11 includes a plot of a single range bin for FFT data and filtered data to show relation with FIG. 10.

FIG. 11 includes a plot of a single range bin for FFT data and filtered data to show relation with FIG. 10, arranged in accordance with at least some embodiments described herein.

Diagram 1100 shows 2D plots 1102 and 1104, which may be seen as a slice taken of a single range bin (or a computational combination or summary of multiple range bins) from the 3D plot of FIG. 10. In relation to the previous figure, plots 1102 and 1104 are a single range bin (a single vertical line through the plots 1002) for the FFT data (1102) and filtered data (1104). Boxes 1106 and 1108 on the plots 1102 and 1104 also show a representation of a typical 5-meter car (box 1106) and a conceptual representation of the potentially 9-meter wide radar beam at a specific range (box 1108). In some examples, plots 1102 and 1104 may show some realizations for at least some event data as the data may be presented to the classification model. In some examples, plots similar to 1102 or 1104 may contain signals reflected from multiple targets and an initial step may be used to separate the multiple targets into separate events. As an example separation technique, an event may have a defined start requirement (e.g., magnitude above a particular value for a particular duration) and a defined end requirement (e.g., magnitude below a particular value for a particular duration) which results in separation of longer data series into multiple separate events. Such separation requirements may make use of additional input data such as supplemental data, data at other ranges and times, or the like.

Figure 12:
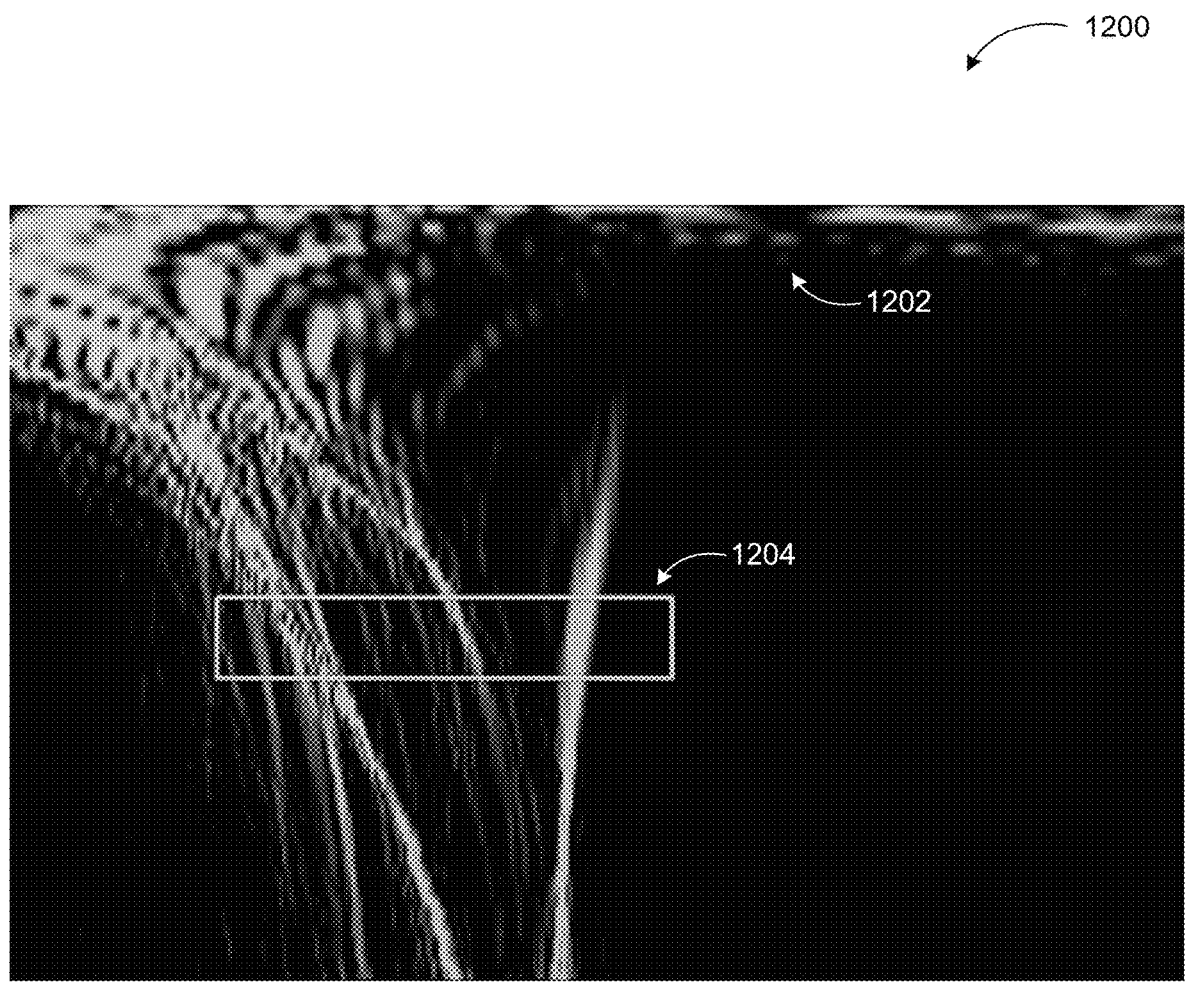
FIG. 12 illustrates a visualization of the impact of SAR style preprocessing to find the highest amplitude reflections.

FIG. 12 illustrates a visualization of the impact of SAR (synthetic aperture radar) style preprocessing to find the highest signal to noise ratio reflections, arranged in accordance with at least some embodiments described herein.

In diagram 1200, time axis is horizontal, each horizontal plotted line (1202) is SAR processed (adjusted for phase and amplitude) based on a different speculated speed, with the focusing effect 1204 indicating a range of close match between the speculative SAR phase correction pre-processing values and the data. The SAR approach may be used to both find speed and sharpen the radar data, although it involves additional computations. In some examples, the additional preprocessing may be more than offset by the simplification of the machine learning classification models that result, providing a smaller net computation cost at the final device. In some cases, such computation to find both speed and sharpen radar data may be used to train either the preprocessor model or classification model or both. For example, such an approach may be used to calibrate phase correction to speed from a particular angle. In other cases, such signal to noise ratios, entropy measurement, or other quality vector may be used as a fitness function (e.g., to maximize or minimize) when training a preprocessor.

For radar data, interference from multiple reflectors has a large influence on observed patterns. This is one of the reasons for complicated differences in radar response for even relatively minor changes in vehicles. SAR or other sliding convolutions may be used to improve the radar signal. In some examples, Wavelet representations may be used. In other examples, other 1D or 2D filters and/or convolutions may be used. Because the radar data is collected over time, vehicles in reverse may look different than vehicles going forwards. This may be used in some cases to identify unusual or inappropriate driving events such as wrong-way driving. In some examples with multiple radar transducers, calculations comparing, correlating, or otherwise relating the multiple signals may be used to detect inappropriate driving events.

In some examples the radar may be positioned such that the detected signals come from multiple lanes going in multiple directions. For example, a roadway radar may be positioned at the side of a highway such that the radar detects events in lanes traveling both left-to-right and right-to-left with respect to the radar. Event data from multiple sensors with different fields of view (e.g., a first sensor on the left and a second sensor on the right) may gather data that exhibits different relations between the multiple sensors depending on the direction of travel of any particular event. For example, a left and right sensor may exhibit a different phase relationship, correlation relationship, or time delay relationship for an event in which a target passes from left-to-right as compared to right-to-left. In some cases, the event may be applied to the model for classification without differential processing based on direction (e.g., the 50 mph model irrespective of direction). In other cases, such as when the relationship between data from multiple antennas is part of the classification, the relationship data may be modified or normalized before being applied to the model. For example, if part of the input to the model as part of the event data is data from multiple sensors, the order in which the data is presented may be rearranged to normalize or remove the impact of direction (e.g., left data in a first array row and right data in a second array row for a target traveling left to right but right data in a first array row and left data in a second array row for a target traveling right to left). The direction of the target may be determined, for example, by application of a preprocessing model, or in another example computed as part of the supplemental data by evaluation of the signals from multiple sensors. In another example approach to handling traffic traveling in multiple directions, the speed may be evaluated over a span of positive and negative numbers to indicate direction (e.g., 50 mph for a target traveling left to right at 50 mph and −50 mph for a target traveling right to left at 50 mph). Similar conventions may be used to indicate traffic approaching or receding from the sensor. In this latter approach, multiple directions of traffic may be handled by introducing more bins or groupings of training data and more models in the plurality of models, or by making bins that accept a wider range of inputs.

In some cases, time-series data may include data where each point is calculated using a grouping of incoming signal data points, and in some cases, the time-series data may have multiple points that share portions of their source signal data. Building more on the example FMCW radar previously discussed, such radars use frequency transformations (e.g., the FFT or Fast Fourier Transform) to generate output data in different range bins. In some examples, an FFT may be performed on 64, 128, 256, 512, 1024, or any other number of signal data points from the antenna subsystem (examples are all a power of 2 because those are most efficient, but this is not required). In some examples, a first FFT may be performed on a first 512 data points and a second FFT may be performed on a second 512 data points where the first 256 values of the second 512 data points may be the last 256 values of the first 512 data points. Thus, sequential outputs from the FFT may include newer data displacing older data but may include some data points that have been previously used in FFT calculations. The sequential outputs of such FFT calculations and other processing steps may form an array separated by range and time (e.g., as conceptually represented in FIG. 9 and FIG. 10).

Alternative Approaches

In some examples, the model network may be designed to operate and train on residues. In some implementations, segments of the architecture may include two levels of dropout and convolutional blocks, and an identity feed forward line going around the dropout and convolutions and summing with their output. This feed-around structure is called a "residue" structure as it reduces the amount of computational change that each set of convolution layers has to perform. The residues may be implemented, for example, by having a multiple path learning network where the input signal is carried around one or multiple learning units and summed or otherwise combined with the output of the learning unit path such that the learning units need only learn residues, which in many cases may have smaller amplitudes.

While the examples shown herein mainly depict 1-D convolutions of various sorts, similar effects may be obtained by replacing the neural network with other forms of machine learning approaches such as higher dimensional convolutional networks, recurrent networks (convolutional or not), adversarial networks, random forests, decision trees, etc., or combinations thereof. Time-series radar data may include amplitude data, phase data, angle data, frequency data or other representations of signals that change over time and are received at the radar antenna. In some examples, a particular time-series data may be the result of preprocessing (whether by a machine learning model or not). For example, a FMCW radar system may perform a Fourier Transform (FFT) during each time period to separate signals by range and then construct a time-series data from related frequency samples across time to generate a time-series data stream that represents signals from a particular range over time. Despite the fact that such a generated time-series is not a literal time-sampling of the signal received at the radar antenna, it is fully considered here to be time-series radar data that may be used to generate training or evaluation.

In another example of processing, one may consider that the initial stages of data manipulation in the learning systems described here are often filters or convolutions that are slid across their input data to produce an output data (which may be intermediary in the overall system). Because synthetic aperture calculations may be performed by such convolution/filter mechanic if the applied kernel is an appropriate phase mask, synthetic aperture computation may be built into the systems described herein by providing a kernel, convolution, or filter that has a phase pattern designed to emphasize signal arriving from a target with particular range and speed. Such synthetic aperture computation may be used at any level of the system or built using multiple levels of the system. For example, synthetic aperture computations may be applied by calculating or estimating a phase correction array and applying at the complex event data level to rotate the phase of each incoming data point.

Some radar systems have a single transmitter and single receiver. Some radar systems may have a single antenna for transmission but two antennas for receiving reflected waves. In other cases, radar systems may have multiple transmitters and multiple receivers. One or more of the received signals from multiple receiver systems may be conjointly analyzed for training and/or classification. In some examples, the processing may include performing relative computations on the data received from the multiple antennas. In other examples, event data may be applied to multiple models, and final classification may be made by combining or evaluating the output of the multiple models. In another example, event data from multiple receivers may be combined to train a single model for classification. The operations and principles described herein may also be implemented in other range-based detection systems such as sonar or lidar.

In some examples, it may be advantageous to preprocess the radar signal. In addition to the FMCW discussion above, other examples of preprocessing may include phase correction or denoising or other techniques some of which have been described above. Due to the recurring oscillations of electromagnetic waves, some radar images may be improved by altering the phase of neighboring samples in a collection of radar inputs using a phase adjustment template. The sliding of such a phase adjustment along a time series of radar data is much like a convolution, and therefore can be integrated into the functions described in some of the examples herein by using the kernel of one or more layers to implement phase adjustment. When a radar signal is phase adjusted in such a way, it is mathematically similar to having a larger aperture and is thus referred to as synthetic aperture radar (SAR). Thus, synthetic aperture processing may be included using an added convolution layer. In other examples, the SAR processing may involve having a 1D convolutional layer with multiple kernels, where each kernel provides SAR correction appropriate for a different supplemental data groups. In further examples, appropriate phase adjustment for SAR correction may be learned using machine learning from a collection of events, automatically learning SAR adjustments for various bins segmented by supplemental data (e.g. speed and range data) while also accounting for other environmental factors. In yet other examples, SAR adjustments may be computed from physical principles of the detection scenario for the supplemental data groups and implemented using the model structure presented herein. Whether or not phase based correction (e.g. SAR computations) are used, a denoiser or preprocessor may be trained by using an autoencoder-type training structure and training with noisy inputs and comparing the outputs to ideal (or less noisy) reference signals. In such a case the training loss is the difference between the radar event generated by the noisy or un-processed signal and the ideal or less noisy output. In this way, radar event data segmented by supplemental information may be used to train a denoiser, SAR correction, or other preprocessing units. Such units may be trained to take any input. In other cases, the preprocessing units may be trained as a plurality and selected using supplemental information to choose the correct one to apply to particular events.

It may be desirable to reduce the size and computational cost of the models discussed herein. A variety of model minimization strategies may be applicable. In some examples, the numeric precision of model parameters may be reduced (e.g., from a 32-bit number representation to a 16-, 8-, or even 5-bit number). In many cases, the majority of the estimates may be achievable even when removing model parameters or connections below a certain threshold. These and other model minimization steps that may be clear to a person skilled in the art are envisioned here as ways to reduce the computation and memory needs of the trained models on final highway radar products.

Each event discussed herein may be considered to be associated with a 2D field of data (range and value versus time) and may be processed similarly. The 1D convolutions discussed previously may be implemented in more dimensions including 2D such as for the 2D radar images above, or even in more dimensions such as 3D for data with additional dimensions such as volumetric data or for data from multiple channels. The system described herein may be implemented in any number of dimensions. For example, 3D data from multiple channels may be represented with 4D tensors and 4D processing. Volumetric data may come from radar with angular resolution, lidar, point clouds from depth sensing, or any other appropriate source.

Implementation examples for a system according to embodiments may include highway radar, sensors for self-driving vehicle, demographic profiling (determining which categories of vehicles are exposed to particular advertising or pass through a particular area), and/or highway planning and usage surveys.

Figure 13:
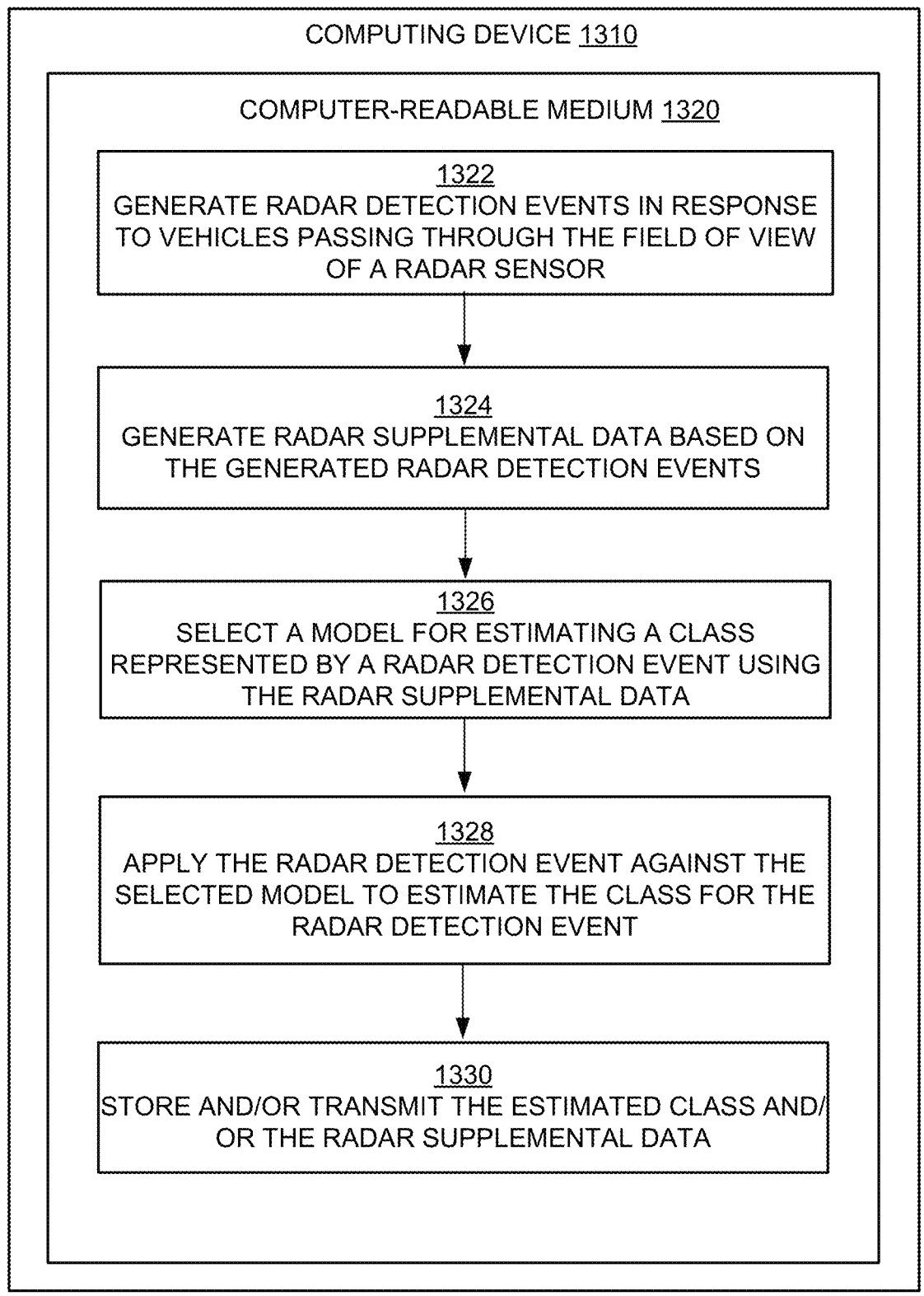
FIG. 13 is a flow diagram illustrating an example flow of high level actions for highway radar vehicle classification across multiple lanes and speeds.

FIG. 13 is a flow diagram illustrating an example flow of high level actions for highway radar vehicle classification across multiple lanes and speeds, arranged in accordance with at least some embodiments described herein.

Figure 15:
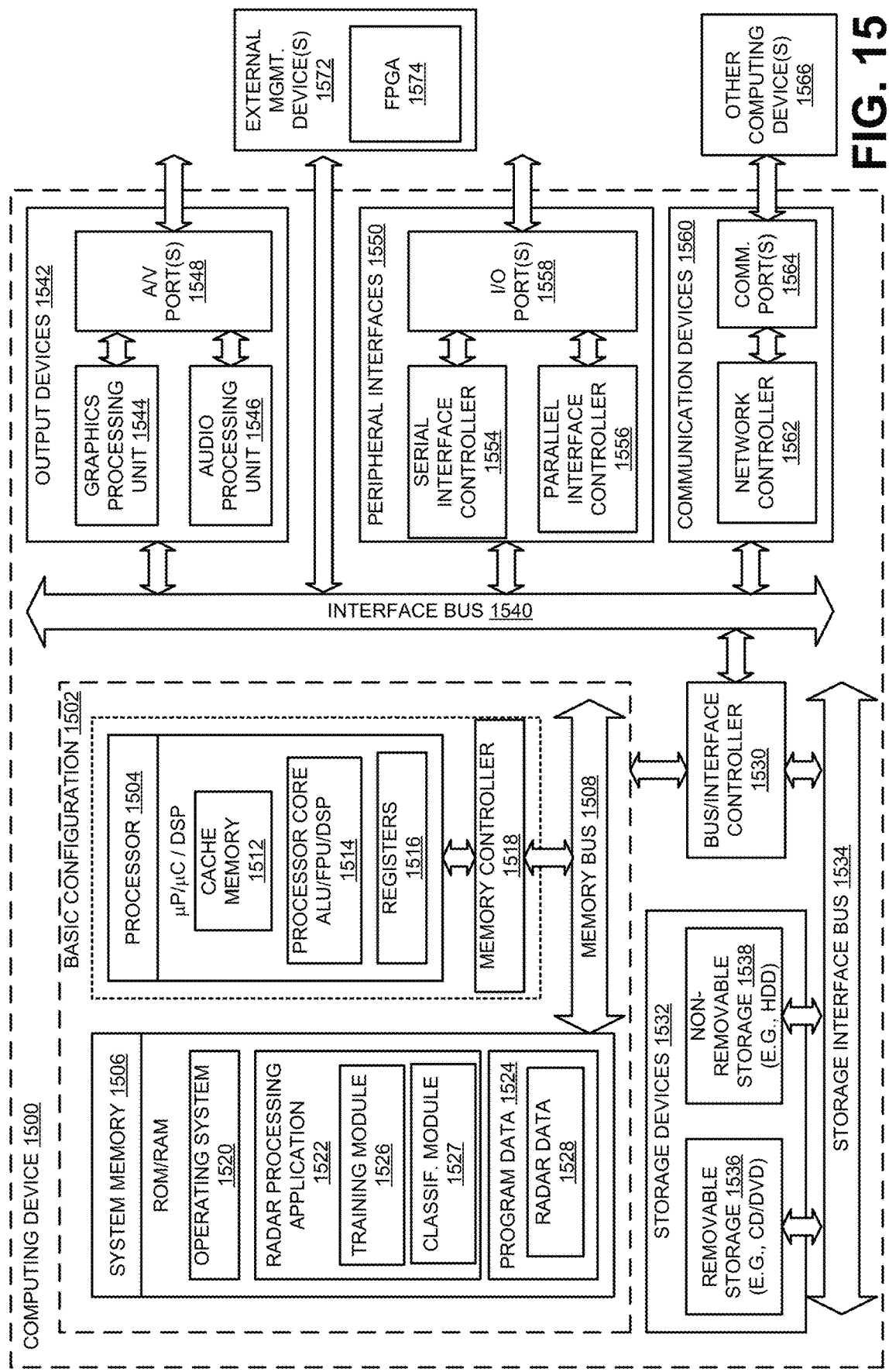
FIG. 15 illustrates a computing device, which may be used to manage highway radar vehicle classification across multiple lanes and speeds.

Example methods may include one or more operations, functions, or actions as illustrated by one or more of blocks 1322, 1324, 1326, 1328, and 1330 may in some embodiments be performed by a specialized computing device for radar processing such as the computing device 1500 in FIG. 15. Such operations, functions, or actions in FIG. 13 and in the other figures, in some embodiments, may be combined, eliminated, modified, and/or supplemented with other operations, functions or actions, and need not necessarily be performed in the exact sequence as shown. The operations described in the blocks 1322-1330 may be implemented through execution of computer-executable (processing) instructions stored in a computer-readable medium such as a computer-readable medium 1320 of a specialized computing device 1310.

An example process to provide highway radar vehicle classification across multiple lanes and speeds may begin with block 1322, "GENERATE RADAR DETECTION EVENTS IN RESPONSE TO VEHICLES PASSING THROUGH THE FIELD OF VIEW OF A RADAR SENSOR", where one or more radar sensors with fields of view directed to a roadway may generate radar events (time-domain signals) from radar signals reflected from vehicles on the roadway. In some cases, the radar detection event data may include a one-dimensional data array.

Block 1322 may be followed by block 1324, "GENERATE RADAR SUPPLEMENTAL DATA BASED ON THE GENERATED RADAR DETECTION EVENTS", where a processor may generate radar supplemental data based on the generated radar detection events. In some examples, the generated radar detection events may be preprocessed before the radar detection event is used to generate supplemental data.

Block 1324 may be followed by block 1326, "SELECT A MODEL FOR ESTIMATING A CLASS REPRESENTED BY A RADAR DETECTION EVENT USING THE RADAR SUPPLEMENTAL DATA", where a controller may use the radar supplemental data to select a model for estimating a class represented by a radar detection event. The model may be selected based on the radar supplemental data matching supplemental data associated with one or more radar detection events used to train the model or based on a lookup table using the radar supplemental data, for example. The model may include variations of convolutional neural network layers, which may include a pooling layer, a global pooling layer, a dense network, and others.

Block 1326 may be followed by block 1328, "APPLY THE RADAR DETECTION EVENT AGAINST THE SELECTED MODEL TO ESTIMATE THE CLASS FOR THE RADAR DETECTION EVENT", where the processor or another processor may apply the radar detection event against the selected model to estimate the class for the radar detection event. In some examples, the generated radar detection events may be padded or truncated to a predetermined length associated with a model before a radar detection event is applied against the model. Separation of incoming events by the similar bins and application to matched models generated by similar sub-data may provide enhanced processing and accuracy of classification of vehicles from highway radar systems.

Block 1328 may be followed by block 1330, "STORE AND/OR TRANSMIT THE ESTIMATED CLASS AND/OR THE RADAR SUPPLEMENTAL DATA", where an output sub-system may store the estimated classification and/or the supplemental data in a storage sub-system. Additional data from the radar event may also be stored. The output sub-system may also transmit the estimated classification to a recipient, for example, a server, a human controller, or other destinations.

The operations included in the process of FIG. 13 are for illustration purposes. Highway radar vehicle classification across multiple lanes and speeds may be implemented by similar processes with fewer or additional operations, as well as in different order of operations using the principles described herein. The operations described herein may be executed by one or more processors operated on one or more radar processing devices, one or more processor cores, and/or specialized processing devices, among other examples.

Figure 14:
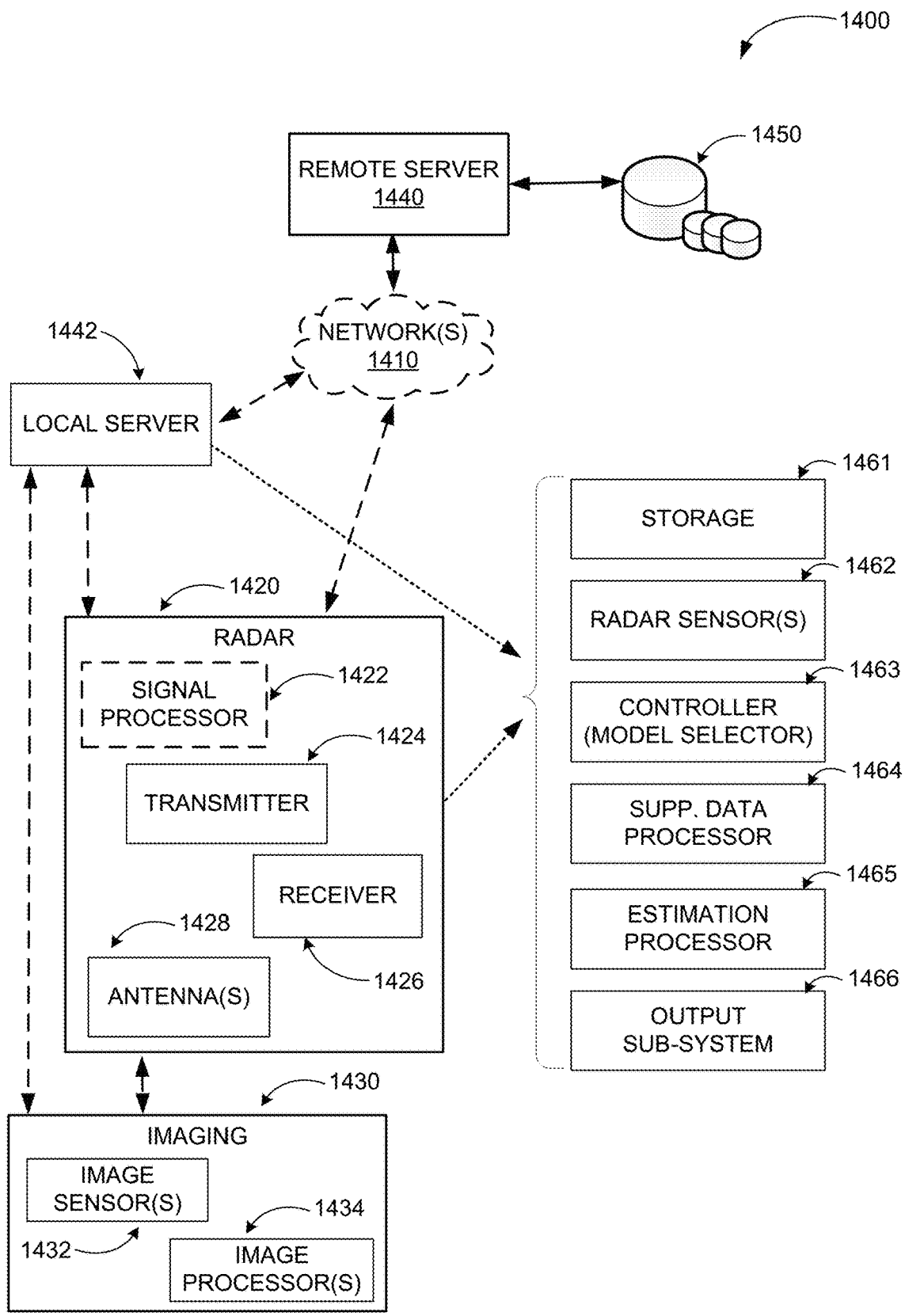
FIG. 14 illustrates major components of an example system for providing highway radar vehicle classification across multiple lanes and speeds.

FIG. 14 illustrates major components of an example system for providing highway radar vehicle classification across multiple lanes and speeds, arranged in accordance with at least some embodiments described herein.

The example system shown in diagram 1400 may include a remote server 1440 managing operations of a radar system according to embodiments, one or more data stores 1450 storing raw radar data, radar supplemental data, models, estimated classifications, and similar information. The remote server 1440 may communicate with a local server 1442 for managing part or all of the radar system operations over one or more networks 1410, which may include private, public, wired, wireless, and other forms of networks using any suitable protocols (e.g., terrestrial and/or satellite-based communications or a combination thereof).

The radar system 1420 may include a transmitter 1424, a receiver 1426, one or more antennas 1428, and an optional signal processor 1422 to process received reflected radar waves. In an example operation, radar waves may be transmitted through the one or more antennas 1428 provided by the transmitter 1424. Reflected waves captured by the one or more antennas 1428 may be initially processed by receiver 1426 and then by the optional signal processor 1422, which may include analog-to-digital conversion (ADC), analog conditioning, digital processing, and other forms of processing. The signal processor 1422 may include a digital signal processor (DSP), a microprocessor, and/or other components such as and analog-to-digital converter, filters, etc. In some cases, the different electronic components may be integrated within the radar system 1420, in another device (e.g., local server 1442), or distributed among various physical devices. In a system according to embodiments, several modules may be employed to train the system for classification of vehicles detected on a roadway and classify the individual vehicles. The modules may be implemented as physical devices, software, or combination thereof, all at the radar system 1420, all at the local server 1442, all at the remote server 1440, or distributed over the components of the system.

The modules may include, but are not limited to, a storage sub-system 1461 to store models, radar supplemental data, and/or classifications; one or more radar sensors 1462 to generate radar detection events in response to vehicles passing through the field(s) of view; a controller 1463 (also referred to as model selector) to select a model for estimating a class represented by a radar detection event using the radar supplemental data; a supplemental data processor 1464 to generate the radar supplemental data based on the generated radar detection events; an estimation processor 1465 to apply the radar detection event against the selected model to estimate the class for the radar detection event; and an output sub-system 1466 to store the estimated class and/or the radar supplemental data to the storage sub-system or transmit the estimated class.

An example system may also include an imaging system 1430 with one or more image sensors 1432 and one or more image processors 1434. The one or more image sensors 1432 may be cameras or similar image capture devices whose sight field may overlap with the field(s) of view of the radar antenna(s) such that still images or videos of vehicles detected by the radar can be captured and used to generate supplemental data (e.g., identify vehicles, speeds, lengths, heights, etc.). Image processor(s) 1434 may process the captured images (or video) and provide appropriate data to one or more of the modules discussed above.

FIG. 15 illustrates a specialized computing device for radar processing, which may be used to manage or perform highway radar vehicle classification across multiple lanes and speeds, arranged in accordance with at least some embodiments described herein.

In an example basic configuration 1502, the computing device 1500 may include one or more processors 1504 and a system memory 1506. A memory bus 1508 may be used to communicate between the processor 1504 and the system memory 1506. The basic configuration 1502 is illustrated in FIG. 15 by those components within the inner dashed line.

Depending on the desired configuration, the processor 1504 may be of any type, including but not limited to a microprocessor (µP), a microcontroller (µC), a digital signal processor (DSP), or any combination thereof. The processor 1504 may include one or more levels of caching, such as a cache memory 1512, a processor core 1514, and registers 1516. The example processor core 1514 may include an arithmetic logic unit (ALU), a floating point unit (FPU), a digital signal processing core (DSP core), or any combination thereof. An example memory controller 1518 may also be used with the processor 1504, or in some implementations, the memory controller 1518 may be an internal part of the processor 1504.

Depending on the desired configuration, the system memory 1506 may be of any type including but not limited to volatile memory (such as RAM), non-volatile memory (such as ROM, flash memory, etc.) or any combination thereof. The system memory 1506 may include an operating system 1520, a radar processing application 1522, and program data 1524. The radar processing application 1522 may include a training module 1526 and a classification module 1527, among other modules. The radar processing application 1522 in conjunction with the training module 1526 may obtain training events from time-sequential radar data provided by a first radar sensor with a field of view that is positionable at a roadway, obtain supplemental data associated with the training events by processing the radar data provided by the radar sensor and/or the training events, separate the training events into groups based on the supplemental data, and train models to estimate a class for a radar detection event. Furthermore, the radar processing application 1522 in conjunction with the classification module 1526 may generate radar detection events in response to vehicles passing through the field of view of the radar sensor, generate radar supplemental data based on the generated radar detection events, select a model to apply to a detected radar event based on the supplemental data, apply the radar detection event against the selected machine learning model to estimate a class for the radar detection event, and store or transmit the estimated class for the radar event. The program data 1524 may include radar data 1528, among other data, as described herein.

The computing device 1500 may have additional features or functionality, and additional interfaces to facilitate communications between the basic configuration 1502 and any desired devices and interfaces. For example, a bus/interface controller 1530 may be used to facilitate communications between the basic configuration 1502 and one or more data storage devices 1532 via a storage interface bus 1534. The data storage devices 1532 may be one or more removable storage devices 1536, one or more non-removable storage devices 1538, or a combination thereof. Examples of the removable storage and the non-removable storage devices include magnetic disk devices such as flexible disk drives and hard-disk drives (HDDs), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 1506, the removable storage devices 1536 and the non-removable storage devices 1538 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 1500. Any such computer storage media may be part of the computing device 1500.

The computing device 1500 may also include an interface bus 1540 for facilitating communication from various interface devices (e.g., one or more output devices 1542, one or more peripheral interfaces 1550, and one or more communication devices 1560) to the basic configuration 1502 via the bus/interface controller 1530. Some of the example output devices 1542 include a graphics processing unit 1544 and an audio processing unit 1546, which may be configured to communicate to various external devices such as a display or speakers via one or more A/V ports 1548, or may be re-purposed as supplemental signal processing accelerators. Additionally, one or more example external management devices 1572 may include an FPGA 1574, which may be configured for computation acceleration or real-time sensitive system operations and may be connected to the basic configuration 1502 via the interface bus 1540. One or more example peripheral interfaces 1550 may include a serial interface controller 1554 or a parallel interface controller 1556, which may be configured to communicate with external devices such as input devices (e.g., keyboard, mouse, pen, voice input device, touch input device, etc.) or other peripheral devices (e.g., printer, scanner, etc.) via one or more I/O ports 1558. An example communication device 1560 includes a network controller 1562, which may be arranged to facilitate communications with one or more other computing devices 1566 over a network communication link via one or more communication ports 1564. The one or more other computing devices 1566 may include servers at a datacenter, radar control equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include non-transitory storage media.

The computing device 1500 may be implemented as a part of a specialized server, mainframe, or similar computer that includes any of the above functions. The computing device 1500 may also be implemented as a personal computer including both laptop computer and non-laptop computer configurations.

FIG. 16 illustrates a block diagram of an example computer program product for radar processing, arranged in accordance with at least some embodiments described herein.

In some examples, as shown in FIG. 16, a computer program product 1600 may include a signal bearing medium 1602 that may also include one or more machine readable instructions 1604 that, in response to execution by, for example, a processor may provide the functionality described herein. Thus, for example, referring to the processor 1504 in FIG. 15, the radar processing application 1522 may perform or control performance of one or more of the tasks shown in FIG. 16 in response to the instructions 1604 conveyed to the processor 1504 by the signal bearing medium 1602 to perform actions associated with managing highway radar vehicle classification across multiple lanes and speeds as described herein. Some of those instructions may include, for example, generate radar detection events in response to vehicles passing through the field of view of a radar sensor; generate radar supplemental data based on the generated radar detection events; select a model for estimating a class represented by a radar detection event using the radar supplemental data; apply the radar detection event against the selected model to estimate the class for the radar detection event; store and/or transmit the estimated class and/or the radar supplemental data, according to some embodiments described herein.

In some implementations, the signal bearing medium 1602 depicted in FIG. 16 may encompass computer-readable medium 1606, such as, but not limited to, a hard disk drive (HDD), a solid state drive (SSD), a compact disc (CD), a digital versatile disk (DVD), a digital tape, memory, etc. In some implementations, the signal bearing medium 1602 may encompass recordable medium 1608, such as, but not limited to, memory, read/write (R/W) CDs, R/W DVDs, etc. In some implementations, the signal bearing medium 1602 may encompass communications medium 1610, such as, but not limited to, a digital and/or an analog communication medium (e.g., a fiber optic cable, a waveguide, a wired communication link, a wireless communication link, etc.). Thus, for example, the computer program product 1600 may be conveyed to one or more modules of the processor 1504 by an RF signal bearing medium, where the signal bearing medium 1602 is conveyed by the communications medium 1610 (e.g., a wireless communications medium conforming with the IEEE 802.11 standard).

According to some examples, a system to detect or classify objects at a roadway is described. The system may include a storage sub-system configured to store a plurality of models for estimating classes represented by a plurality of radar detection events; a first radar sensor having a first field of view that is positionable at the roadway, where the first radar sensor is configured to generate the plurality of radar detection events in response to vehicles passing through the first field of view; a first processor configured to generate radar supplemental data based on the generated plurality of radar detection events; a controller configured to select a model for estimating a class represented by a radar detection event using the radar supplemental data or data from another sensor; a second processor configured to apply the radar detection event against the selected model to estimate the class for the radar detection event; and an output sub-system configured to one or more of store the estimated class in the storage sub-system or transmit the estimated class to a recipient. Some or all of the components of an example system such as the first processor, the controller, and/or the second processor may be combined and/or implemented as a single component (e.g., processor).

According to other examples, the controller may be configured to select the model for estimating the class represented by the radar detection event based on the radar supplemental data matching supplemental data associated with one or more radar detection events used to train the model. The controller may also be configured to select the model for estimating the class represented by the radar detection event based on a lookup table using the radar supplemental data. The model may include convolutional neural network layers. The model may be a partial model and the second processor may be configured to estimate the class using a full model comprising the partial model and one or more additional convolutional layers. The model may also include strided convolutional neural network levels. The model may include one or more of a pooling layer, a global pooling layer, or residual connections. The generated plurality of radar detection events may be padded or truncated to a predetermined length associated with the model before the radar detection event is applied against the model. Radar detection event data may include a one-dimensional data series.

According to further examples, the controller may be configured to select a plurality of models for estimating the class represented by the radar detection event. The generated plurality of radar detection events may be padded or truncated to a predetermined length before the radar detection event is applied against the plurality of models. Each model of the plurality of models may have a different number of layers. Each model of the plurality of models may have at least one different kernel value or at least one different kernel length compared to other models of the plurality of models. The supplemental data may be associated with one or more of a lane in which the vehicles are detected, a length of the vehicles, a speed of the vehicles, a height of the vehicles, or an obstruction. The system may also include a second radar sensor having a second field of view that is positionable at the roadway, where the second radar sensor is configured to generate another plurality of radar detection events in response to the vehicles passing through the second field of view. The first field of view and the second field of view may be configured to overlap. The plurality of radar detection events and the other plurality of radar detection events may be used to classify a same target vehicle.

According to other examples, a radar apparatus to detect or classify vehicles at a roadway is described. The radar apparatus may include a first radar sensor having a first field of view that is positionable at the roadway, where the first radar sensor is configured to generate the plurality of radar detection events in response to vehicles passing through the first field of view, and wherein each radar detection event is a time series of numeric values derived from the signal detected at the first radar sensor; a first processor configured to generate radar supplemental data based on the generated plurality of radar detection events; a second processor configured to apply a radar detection event against a stored machine learning model to estimate a class for the radar detection event by selecting the stored machine learning model based on the radar supplemental data; and an output sub-system configured to store the estimated class and the generated radar supplemental data in the storage sub-system or transmit the estimated class the generated radar supplemental data to a recipient.

According to further examples, a method to detect or classify vehicles at a roadway is described. The method may include obtaining a plurality of training events from time-sequential radar data provided by a first radar sensor having a first field of view that is positionable at the roadway; obtaining supplemental data associated with the training events by processing one or more of the radar data provided by the first radar sensor or the training events; separating the training events into a plurality of groups based on the supplemental data; and training a plurality of models to estimate a class for a radar detection event.

According to some examples, each radar event may be a time series of a time-varying amplitude. The stored model may be selected based on supplemental data matching the supplemental data on the events used to train the stored model or based on a lookup table using the supplemental data. In cases where the model is a partial model and the second processor is configured to estimate the class using a full model comprising the partial model and one or more additional convolutional layers, the one or more additional convolutional layers may perform synthetic aperture signal focusing.

According to one example, multiple radar sensors may include 16 sensors directed over a series of angles such that each sensor is pointed in a slightly different direction to provide coverage of a larger angular field of view. In this example, the radar sensors may perceive the same target from multiple angles. Supplemental data may include multiple ranges and angles, such as a range bin per angle of detection. In some examples, multiple models may be selected for classification based on the range bin for each angle or beam where the target is detected.

According to some examples, the data from multiple radar sensors may be evaluated separately by models selected for each sensor or group of sensors, and a final classification may be based on the output of multiple models According to some examples where multiple models are used, the output of each model may be more complex than a vehicle classification. For example, each of a first plurality of models may output an intermediate representation of the event data presented to each of the first models and one or more second models may then be used to classify the target based on being presented with the intermediate representations produced by the first plurality of models.

According to further examples in which a first plurality of models provides inputs for one or more second models, the one or more second models may also receive additional input data such as supplemental data as previously described.

According to some examples, event data may be normalized before being presented to one or more models for evaluation by using a speed input to convert time-domain data into spatial data.

According to some examples, event data may be normalized before being presented to one or more models for evaluation by altering magnitude to correct for distance.

According to some examples a radar signal may be polarized (e.g., linearly polarized or circularly polarized) to enhance the number and type of features available for classification.

According to further examples, multiple sensors may be configured with antennas that have different polarizations to increase the diversity of detected features.

According to some examples a radar signal may include multiple orthogonal polarizations (e.g. vertical and horizontal polarizations, or right handed and left handed circular polarizations). These multiple orthogonal polarizations may then be received by one or by multiple antennas.

According to further examples, computing the speed, headway and classification of detected vehicles, a platooning formation can be detected based on selected headway thresholds. Detecting platooning formation of defined vehicles, i.e., big trucks, small trucks, regular passenger vehicles, are good indicators of increasing traffic capacity. Platoon formation, known as flocking, is defined as detection of multiple vehicles moving at the same speed with closer headway between the vehicles. Vehicle classification may enhance the platoon description as it detects the type of vehicles in the platoon.

There are various vehicles by which processes and/or systems and/or other technologies described herein may be affected (e.g., hardware, software, and/or firmware), and the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

It is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A radar processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A system to detect or classify objects at a roadway by collecting a single value as the single value changes over time, the system comprising:
    a storage sub-system configured to store a plurality of machine learning models for estimating classes represented by a plurality of radar detection events;
    a first radar sensor having a first field of view that is positioned in a stationary manner at the roadway, wherein the first radar sensor is configured to generate the plurality of time-domain radar detection events in response to vehicles passing through the first field of view;
    a first processor configured to generate radar supplemental data based on the generated plurality of time-domain radar detection events, wherein the supplemental data includes one or more of a lane in which the vehicles are detected, a length of the vehicles, a speed of the vehicles, a height of the vehicles, or an obstruction;
    a controller configured to select, using the radar supplemental data, a machine learning model from the plurality of machine learning models for estimating a class represented by a time-domain radar detection event;
    a second processor configured to apply the time-domain radar detection event against the selected machine learning model to estimate the class for the time-domain radar detection event; and
    an output sub-system configured to one or more of:
        store the estimated class in the storage sub-system; or
        transmit the estimated class to a recipient.

2. The system of claim 1, wherein the controller is configured to select the machine learning model for estimating the class represented by the time-domain radar detection event based on the radar supplemental data matching supplemental data associated with one or more time-domain radar detection events used to train the machine learning model.

3. The system of claim 1, wherein the controller is configured to select the machine learning model for estimating the class represented by the time-domain radar detection event based on a lookup table using the radar supplemental data.

4. The system of claim 1, wherein the machine learning model includes convolutional neural network layers.

5. The system of claim 4, wherein the machine learning model is a partial machine learning model and the second processor is configured to estimate the class using a full machine learning model comprising the partial machine learning model and one or more additional convolutional layers.

6. The system of claim 1, wherein the machine learning model comprises strided convolutional neural network levels.

7. The system of claim 1, wherein the machine learning model comprises a pooling layer.

8. The system of claim 1, wherein the machine learning model comprises a global pooling layer.

9. The system of claim 1, wherein the machine learning model comprises residual connections.

10. The system of claim 1, wherein the generated plurality of radar detection events are padded or truncated to a predetermined length associated with the machine learning model before the time-domain radar detection event is applied against the machine learning model.

11. The system of claim 1, wherein radar detection event data comprises a one-dimensional data series.

12. The system of claim 1, wherein the controller is configured to select the plurality of machine learning models for estimating the class represented by the time-domain radar detection event.

13. The system of claim 12, wherein the generated plurality of radar detection events are padded or truncated to a predetermined length before the time-domain radar detection event is applied against the plurality of machine learning models.

14. The system of claim 12, wherein each machine learning model of the plurality of machine learning models has a different number of layers.

15. The system of claim 12, wherein each machine learning model of the plurality of machine learning models has at least one different kernel value or at least one different kernel length compared to other machine learning models of the plurality of machine learning models.

16. The system of claim 1, further comprising:
a second radar sensor having a second field of view that is positioned at the roadway, wherein the second radar sensor is configured to generate another plurality of time-domain radar detection events in response to the vehicles passing through the second field of view.

17. The system of claim 16, wherein the first field of view and the second field of view are configured to overlap.

18. The system of claim 16, wherein the plurality of time-domain radar detection events and the other plurality of time-domain radar detection events are used to classify a same target vehicle.

19. A radar apparatus to detect or classify vehicles at a roadway by collecting a single value as the single value changes over time, the radar apparatus comprising:
a first radar sensor having a first field of view that is positioned in a stationary manner at the roadway, wherein the first radar sensor is configured to generate the plurality of time-domain radar detection events in response to vehicles passing through the first field of view, and wherein each time-domain radar detection event is a time series of numeric values derived from the signal detected at the first radar sensor;
a first processor configured to generate radar supplemental data based on the generated plurality of time-domain radar detection events, wherein the supplemental data includes one or more of a lane in which the vehicles are detected, a length of the vehicles, a speed of the vehicles, a height of the vehicles, or an obstruction;
a second processor configured to apply a time-domain radar detection event against a stored machine learning model to estimate a class for the time-domain radar detection event by selecting the stored machine learning model from a plurality of stored machine learning models based on the radar supplemental data; and
an output sub-system configured to:
store the estimated class and the generated radar supplemental data in the storage sub-system; or
transmit the estimated class the generated radar supplemental data to a recipient.

* * * * *